United States Patent
Sugawara et al.

(10) Patent No.: US 12,507,318 B2
(45) Date of Patent: Dec. 23, 2025

(54) USER EQUIPMENT (UE)

(71) Applicant: SHARP KABUSHIKI KAISHA, Sakai (JP)

(72) Inventors: Yasuo Sugawara, Sakai (JP); Shuichiro Chiba, Sakai (JP); Masaki Izumi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 315 days.

(21) Appl. No.: 18/107,495

(22) Filed: Feb. 8, 2023

(65) Prior Publication Data

US 2024/0147576 A1     May 2, 2024

(30) Foreign Application Priority Data

Nov. 2, 2022    (JP)  ................. 2022-176282

(51) Int. Cl.
*H04W 76/50*      (2018.01)
*H04W 60/00*      (2009.01)
*H04W 84/04*      (2009.01)

(52) U.S. Cl.
CPC ........... *H04W 76/50* (2018.02); *H04W 60/00* (2013.01); *H04W 84/042* (2013.01)

(58) Field of Classification Search
CPC ............ H04B 7/18513; H04B 7/18558; H04B 7/18519; H04W 4/90; H04W 48/02; H04W 76/50; H04W 88/02; H04L 69/28
USPC ...................................................... 455/404.1
See application file for complete search history.

(56) References Cited

U.S. PATENT DOCUMENTS

2023/0043459 A1*   2/2023   Shrestha ............... H04W 60/04

OTHER PUBLICATIONS

"3rd Generation Partnership Project; Technical Specification Group Services and System Aspects; System architecture for the 5G System (5GS); Stage 2 (Release 17)", 3GPP TS 23.501 V17.6.0 (Sep. 2022).
"3rd Generation Partnership Project; Technical Specification Group Services and System Aspects; Procedures for the 5G System (5GS); Stage 2 (Release 17)", 3GPP TS 23.502 V17.6.0 (Sep. 2022).
"3rd Generation Partnership Project; Technical Specification Group Core Network and Terminals; Non-Access-Stratum (NAS) protocol for 5G System (5GS); Stage 3; (Release 17)", 3GPP TS 24.501 V17.8.0 (Sep. 2022).

(Continued)

*Primary Examiner* — Maria El-Zoobi
(74) *Attorney, Agent, or Firm* — ScienBiziP, P.C.

(57) ABSTRACT

A UE capable of performing communication via a satellite receives a wait range via a first satellite from a first PLMN. In a case that the UE becomes able to perform communication via a second satellite connected to a second PLMN after becoming unable to perform communication via the first satellite, the UE selects the second PLMN, generates a wait timer based on the wait range, and starts a timer using the wait timer. In a case that an emergency call is made during the timer is running, the UE stops the timer and performs a registration procedure for the emergency call. In a case that an emergency call is not made during the timer is running, the UE performs the registration procedure after the timer expires.

3 Claims, 5 Drawing Sheets

(56) References Cited

OTHER PUBLICATIONS

"3rd Generation Partnership Project; Technical Specification Group Services and System Aspects; Study on Integration of satellite components in the 5G architecture; Phase 2 (Release 18)", 3GPP TR 23.700-28 V1.1.1 (Oct. 2022).
3GPP TS 23.501 V17.4.0 (Mar. 2022), 3rd Generation Partnership Project; Technical Specification Group Services and System Aspects; System architecture for the 5G System (5GS); Stage 2 (Release 17), pp. 115-117.
Samsung, "Emergency PDU session while the timer for disaster roaming wait range is running", C1-223648, 3GPP TSG-CT WG1 Meeting #136-e, E-Meeting, May 12-20, 2022.
Vivo, Samsung, "Conclusion of Key Issue #1 signalling overload aspect", S2-2209665(was S2-2208934r14), SA WG2 Meeting #153E Oct. 10-17, 2022, Elbonia.

* cited by examiner

USER EQUIPMENT (UE)

TECHNICAL FIELD

The present invention relates to a User Equipment (UE).

BACKGROUND ART

In the 3rd Generation Partnership Project (3GPP) (trade name), system architecture of a 5G System (5GS) corresponding to a fifth generation (5G) mobile communication system has been under study, and support of new procedures and new functions has been discussed (see NPLs 1 to 3).

CITATION LIST

Non Patent Literature

NPL 1: 3GPP TS 23.501 V17.6.0 (2022-09); 3rd Generation Partnership Project; Technical Specification Group Services and System Aspects; System architecture for the 5G System (5GS); Stage 2 (Release 17)

NPL 2: 3GPP TS 23.502 V17.6.0 (2022-09); 3rd Generation Partnership Project; Technical Specification Group Services and System Aspects; Procedures for the 5G System (5GS); Stage 2 (Release 17)

NPL 3: 3GPP TS 24.501 V17.8.0 (2022-09); 3rd Generation Partnership Project; Technical Specification Group Core Network and Terminals; Non-Access-Stratum (NAS) protocol for 5G System (5GS); Stage 3; (Release 17)

NPL 4: 3GPP TR 23.700-28 V1.1.1 (2022-10); 3rd Generation Partnership Project; Technical Specification Group Services and System Aspects; Study on Integration of satellite components in the 5G architecture; Phase 2 (Release 18)

SUMMARY OF INVENTION

Technical Problem

In Release 17, satellite communication function in 3GPP is introduced. In Release 18, enhancement to the function has been discussed. Specifically, movement management in a case that coverage areas of satellites are discontinuous (case of discontinuous satellite coverage) and enhancement of power consumption (power saving enhancement) in a UE have been discussed. However, detailed behaviors of the UE and the network have not been clarified (see NPL 4).

An aspect of the present invention is made in view of the circumstances as described above, and is to clarify detailed behaviors of the UE and the network regarding movement management in a case that coverage areas of satellites are discontinuous (case of discontinuous satellite coverage) and enhancement of power consumption (power saving enhancement) in the UE.

Solution to Problem

A UE according to an aspect of the present invention includes a transmission and/or reception unit and a controller. The UE is a UE capable of performing communication via a satellite. The transmission and/or reception unit receives, from a network, a wait range in a registration procedure, and/or a configuration update procedure, and/or a service request procedure, and/or a de-registration procedure performed in a first PLMN via a first satellite. In a case that the UE becomes able to perform communication via a second satellite connected to a second PLMN after becoming unable to perform communication via the first satellite, the controller selects the second PLMN, the controller generates a wait timer based on the wait range, and the controller starts a timer using the wait timer. In a case that an emergency call is made during the timer is running, the controller stops the timer and performs the registration procedure for the emergency call. In a case that an emergency call is not made during the timer is running, the controller performs the registration procedure after the timer expires.

Advantageous Effects of Invention

According to an aspect of the present invention, detailed behaviors of a UE and a network regarding movement management in a case that coverage areas of satellites are discontinuous (case of discontinuous satellite coverage) and enhancement of power consumption (power saving enhancement) in the UE can be clarified.

DESCRIPTION OF EMBODIMENTS

A preferred embodiment for carrying out an aspect of the present invention will be described below with reference to the drawings. Note that, as an example, an embodiment of a mobile communication system to which an aspect of the present invention is applied will be described in the present embodiment.

1. Overview of System

Figure 1:
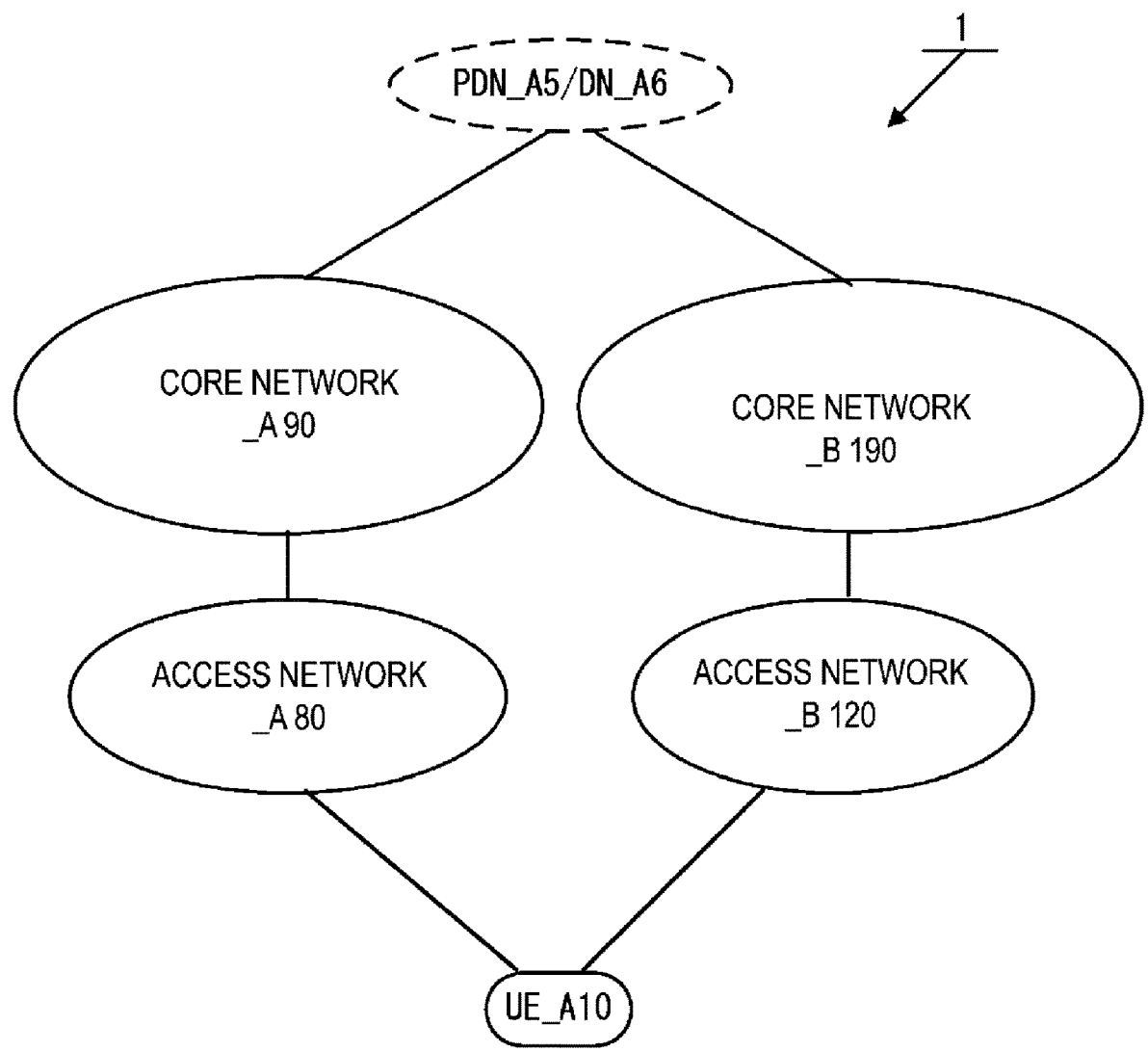
FIG. 1 is a diagram illustrating an overview of a mobile communication system (EPS/5GS).
Figure 2:
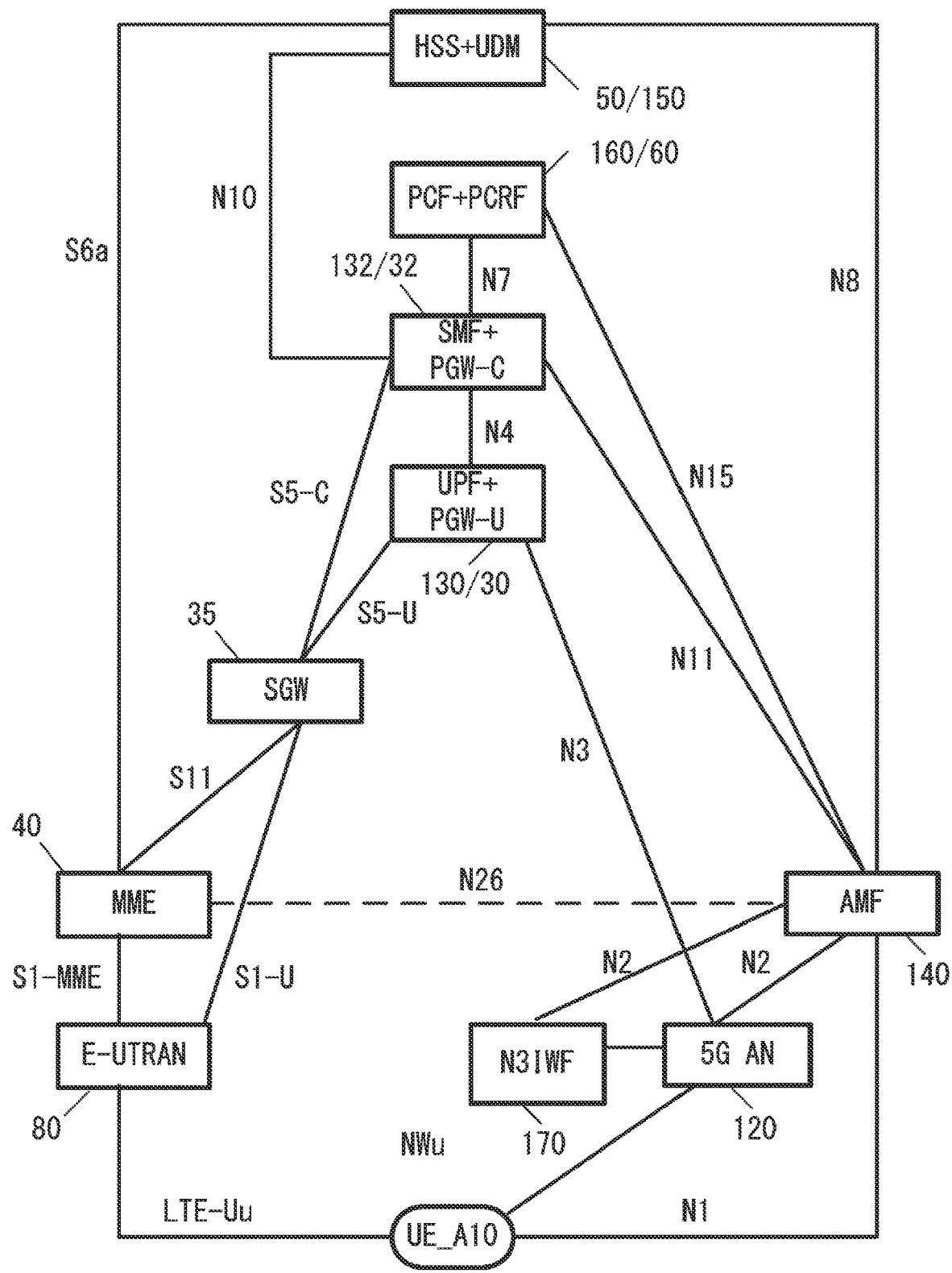
FIG. 2 is a diagram illustrating a detailed configuration of the mobile communication system (EPS/5GS).

First, FIG. 1 is a diagram illustrating an overview of a mobile communication system 1 used in each embodiment, and FIG. 2 is a diagram illustrating a detailed configuration of the mobile communication system 1.

In the illustration of FIG. 1, the mobile communication system 1 includes a UE_A 10, an access network_A 80, a core network_A 90, a Packet Data Network (PDN)_A 5, an access network_B 120, a core network_B 190, and a Data Network (DN)_A 6.

In the following description, the symbols may be omitted, such as in a UE, an access network_A, a core network_A, a PDN, an access network B, a core network B, and a DN, in regard to these apparatuses and functions.

FIG. 2 illustrates apparatuses and functions such as a UE_A 10, an E-UTRAN 80, an MME 40, an SGW 35, a PGW-U 30, a PGW-C 32, a PCRF 60, an HSS 50, a 5G AN 120, an AMF 140, a UPF 130, an SMF 132, a PCF 160, a UDM 150, and an N3IWF 170, and interfaces for connecting these apparatuses and functions to each other.

In the following description, the symbols may be omitted, such as in a UE, an E-UTRAN, an MME, an SGW, a PGW-U, a PGW-C, a PCRF, an HSS, a 5G AN, an AMF, a UPF, an SMF, a PCF, a UDM, and an N3IWF, in regard to these apparatuses and functions.

Note that an Evolved Packet System (EPS) that is a 4G system includes the access network_A and the core network_A and may further include the UE and/or the PDN. A 5G System (5GS) that is a 5G system includes the UE, the access network_B, and the core network_B and may further include the DN.

The UE is an apparatus that can be connected to a network service over 3GPP access (also referred to as a 3GPP access network or a 3GPP AN) and/or non-3GPP access (also referred to as a non-3GPP access network or a non-3GPP AN). The UE may be a terminal apparatus capable of performing radio communication, such as a mobile phone or a smartphone, and may be a terminal apparatus that can be connected to the EPS and/or the 5GS. The UE may include a Universal Integrated Circuit Card (UICC) and an Embedded UICC (eUICC). Note that the UE may be referred to as a user equipment or a terminal apparatus.

The access network_A corresponds to an Evolved Universal Terrestrial Radio Access Network (E-UTRAN) and/or a radio LAN access network. In the E-UTRAN, one or more evolved Node Bs (eNBs) 45 are deployed. Note that in the following description, the symbol for the eNB 45 may be omitted such as in an eNB. In a case that there are multiple eNBs, the eNBs are connected to each other via, for example, an X2 interface. In the radio LAN access network, one or more access points are deployed.

The access network_B corresponds to a 5G access network (5G AN). The 5G AN includes an NG Radio Access Network (NG-RAN) and/or a non-3GPP access network. In the NG-RAN, one or more NR NodeBs (gNBs) 122 are deployed. Note that in the following description, the symbol for the gNB 122 may be omitted, such as in a gNB. The gNB is a node that provides a New Radio (NR) user plane and control plane to the UE, and is connected to a 5GCN via the NG interface (including the N2 interface or the N3 interface). In other words, the gNB is a base station apparatus newly designed for the 5GS and has functions different from those of the base station apparatus (eNB) designed for the EPS that is a 4G system. In a case that there are multiple gNBs, the gNBs are connected to each other via, for example, an Xn interface.

A non-3GPP access network may include an untrusted non-3GPP access network and a trusted non-3GPP access network. Here, the untrusted non-3GPP access network may be a non-3GPP access network, such as a public wireless LAN, without security management performed in the access network, for example. On the other hand, the trusted non-3GPP access network may be an access network defined by 3GPP and may include a trusted non-3GPP access point (TNAP) and a trusted non-3GPP Gateway function (TNGF).

In the following description, the E-UTRAN and the NG-RAN may be referred to as 3GPP access. The radio LAN access network and the non-3GPP AN may be referred to as non-3GPP access. The nodes deployed in the access network_B may also be collectively referred to as NG-RAN nodes.

In the following description, the access network_A, the access network_B, an apparatus included in the access network_A, and an apparatus included in the access network_B may be referred to as an access network, an access network apparatus, or an intra-access network apparatus.

The core network_A corresponds to an Evolved Packet Core (EPC). In the EPC, for example, a Mobility Management Entity (MME), a Serving Gateway (SGW), a Packet Data Network Gateway (PGW)-U, a PGW-C, a Policy and Charging Rules Function (PCRF), a Home Subscriber Server (HSS), and the like are deployed.

The core network_B corresponds to a 5G Core Network (5GCN). In the 5GCN, an Access and Mobility Management Function (AMF), a User Plane Function (UPF), a Session Management Function (SMF), a Policy Control Function (PCF), a Unified Data Management (UDM), and the like are deployed. Here, the 5GCN may be referred to as a 5GC.

In the following description, the core network_A, the core network_B, an apparatus included in the core network_A, and an apparatus included in the core network_B may be referred to as a core network, a core network apparatus, or an intra-core network apparatus.

The core network (the core network_A and/or the core network_B) may refer to an IP mobile communication network operated by a mobile communication operator (Mobile Network Operator (MNO)) connecting the access network (the access network_A and/or the access network_B) and the PDN and/or the DN, a core network for a mobile communication operator that operates and manages the mobile communication system 1, or a core network for a virtual mobile communication operator and a virtual mobile communication service provider such as a Mobile Virtual Network Operator (MVNO) and a Mobile Virtual Network Enabler (MVNE).

FIG. 1 illustrates a case that the PDN and the DN are the same; however the PDN and the DN may be different. The PDN may be a Data Network (DN) that provides communication services for the UE. Note that the DN may be configured as a packet data service network or may be configured for each service. In addition, the PDN may include a connected communication terminal. Thus, "to be connected to the PDN" may mean "to be connected to a communication terminal and/or a server apparatus deployed in the PDN". In addition, "to transmit and/or receive user data to and/or from the PDN" may mean "to transmit and/or receive user data to and/or from a communication terminal and/or a server apparatus deployed in the PDN". Note that the PDN may be referred to as a DN, and the DN may be referred to as a PDN.

In the following, at least some of the access network_A, the core network_A, the PDN, the access network_B, the core network_B, and the DN, and/or one or more apparatuses included in these may be referred to as a network or a network apparatus. In other words, the expression that "the network and/or the network apparatus transmits and/or receives a message and/or performs a procedure" means that "at least some of the access network_A, the core network_A, the PDN, the access network B, the core network B, and the DN, and/or one or more apparatuses included in these transmit and/or receive a message and/or perform a procedure".

The UE can be connected to the access network. The UE can be connected to the core network over the access network. In addition, the UE can be connected to the PDN or the DN over the access network and the core network. In other words, the UE can transmit and/or receive (communicate) user data to and/or from the PDN or the DN. In a case that user data is transmitted and/or received, not only Internet Protocol (IP) communication but also non-IP communication may be used.

Here, IP communication refers to data communication using the IP, and data is transmitted and/or received using IP packets. The IP packet includes an IP header and a payload part. In the payload part, data transmitted and/or received by the apparatuses and functions included in the EPS and the apparatuses and functions included in the 5GS may be included. Non-IP communication refers to data communication not using the IP, where data is transmitted and/or received in a form different from the structure of the IP packets. For example, non-IP communication may be data communication implemented through transmission and/or reception of application data to which an IP header is not added, or user data transmitted and/or received by the UE may be transmitted and/or received with another header such as a MAC header and an Ethernet (trade name) frame header added.

Apparatuses which are not illustrated in FIG. 2 may be configured in the access network_A, the core network_A, the access network B, the core network B, the PDN_A, and the DN_A. For example, the core network_A and/or the core network_B may include an Authentication Server Function (AUSF) and an Authentication, authorization, and accounting (AAA) server (AAA-S).

Here, an AUSF is a core network apparatus provided with an authentication function for 3GPP access and non-3GPP access. Specifically, the AUSF is a network function unit that receives an authentication request for 3GPP access and/or non-3GPP access from the UE and performs an authentication procedure.

The AAA server is an apparatus that is connected directly to the AUSF or indirectly to the AUSF via another network apparatus and has authentication, authorization, and billing functions. The AAA server may be a network apparatus within the core network. Note that the AAA server may not be included in the core network_A and/or the core network_B and may be included in the PLMN. In other words, the AAA server may be a core network apparatus or may be an apparatus outside the core network. For example, the AAA server may be a server apparatus within the PLMN managed by a 3rd party.

Note that, although each of the apparatuses and functions is illustrated one for simplicity in FIG. 2, multiple similar apparatuses and functions may be included in the mobile communication system 1. Specifically, multiple apparatuses and functions such as the UE As 10, the E-UTRANs 80, the MMES 40, the SGWs 35, the PGW-Us 30, the PGW-Cs 32, the PCRFs 60, the HSSs 50, the 5G ANs 120, the AMFs 140, the UPFs 130, the SMFs 132, the PCFs 160, and/or the UDMs 150 may be included in the mobile communication system 1.

2. Configuration of Each Apparatus

Next, a configuration of each apparatus (the UE, and/or the access network apparatus, and/or the core network apparatus) used in each embodiment will be described with reference to the drawings. Note that each apparatus may be configured as physical hardware, may be configured as logical (virtual) hardware configured in general-purpose hardware, or may be configured as software. At least a part (including all) of the functions of each apparatus may be configured as physical hardware, logical hardware, or software.

Note that each of the storage units (storage unit_A 340, storage unit_B 540, and storage unit_B 740) in the apparatuses and functions appearing below includes, for example, a semiconductor memory, a Solid State Drive (SSD), a Hard Disk Drive (HDD), or the like. Each storage unit can store not only information originally configured at the time of being shipped, but also various pieces of information transmitted and/or received to and/or from apparatuses and functions (for example, the UE, and/or the access network apparatus, and/or the core network apparatus, and/or the PDN, and/or the DN) other than the apparatus and functions of each storage unit. Each storage unit can store identification information, control information, flags, parameters, and the like included in a control message transmitted and/or received in various communication procedures to be described later. Each storage unit may store these pieces of information for each UE. In a case that each storage unit performs interworking between the 5GS and the EPS, each storage unit can store a control message and user data transmitted and/or received to and/or from the apparatuses and functions included in the 5GS and/or the EPS. In this case, not only information transmitted and/or received over the N26 interface but also information transmitted and/or received without using the N26 interface can be stored.

2.1. Apparatus Configuration of UE

Figure 3:
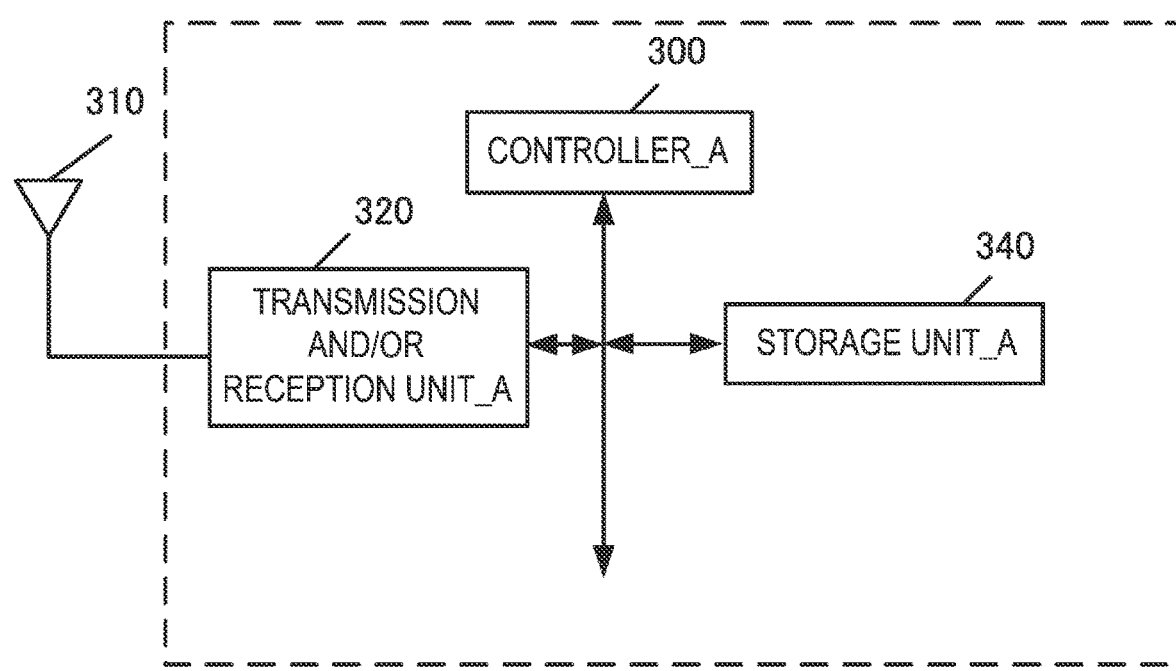
FIG. 3 is a diagram illustrating an apparatus configuration of a UE.

First, an apparatus configuration example of the User Equipment (UE) will be described with reference to FIG. 3. The UE includes a controller A 300, an antenna 310, a transmission and/or reception unit A 320, and a storage unit_A 340. The controller_A 300, the transmission and/or reception unit A 320, and the storage unit_A 340 are connected via a bus. The transmission and/or reception unit A 320 connects to the antenna 310.

The controller_A 300 is a function unit that controls the entire operations and functions of the UE. The controller_A 300 reads and performs various programs stored in the storage unit_A 340 as necessary, and thereby implements various types of processing in the UE.

The transmission and/or reception unit A 320 is a function unit for performing radio communication with the base station apparatus (the eNB or the gNB) in the access network via the antenna. In other words, with the use of the transmission and/or reception unit A 320, the UE can transmit and/or receive user data and/or control information to and/or from the access network apparatus, and/or the core network apparatus, and/or the PDN, and/or the DN.

Following is a detailed description with reference to FIG. 2. With the use of the transmission and/or reception unit A 320, the UE can communicate with the base station apparatus (eNB) in the E-UTRAN over the LTE-Uu interface. The UE can communicate with the base station apparatus (gNB) in the 5G AN with the use of the transmission and/or reception unit A 320. The UE can transmit and/or receive a Non-Access-Stratum (NAS) message to and/or from the AMF over the N1 interface with the use of the transmission and/or reception unit A 320. Note that the N1 interface is a logical interface, and thus communication between the UE and the AMF is actually performed over the 5G AN.

The storage unit_A 340 is a function unit for storing programs, user data, control information, and the like necessary for each operation of the UE. The storage unit 340 may have a function of storing control information transmitted and/or received to and/or from the access network apparatus, the core network apparatus, and the DN.

2.2. Apparatus Configuration of gNB

Figure 4:
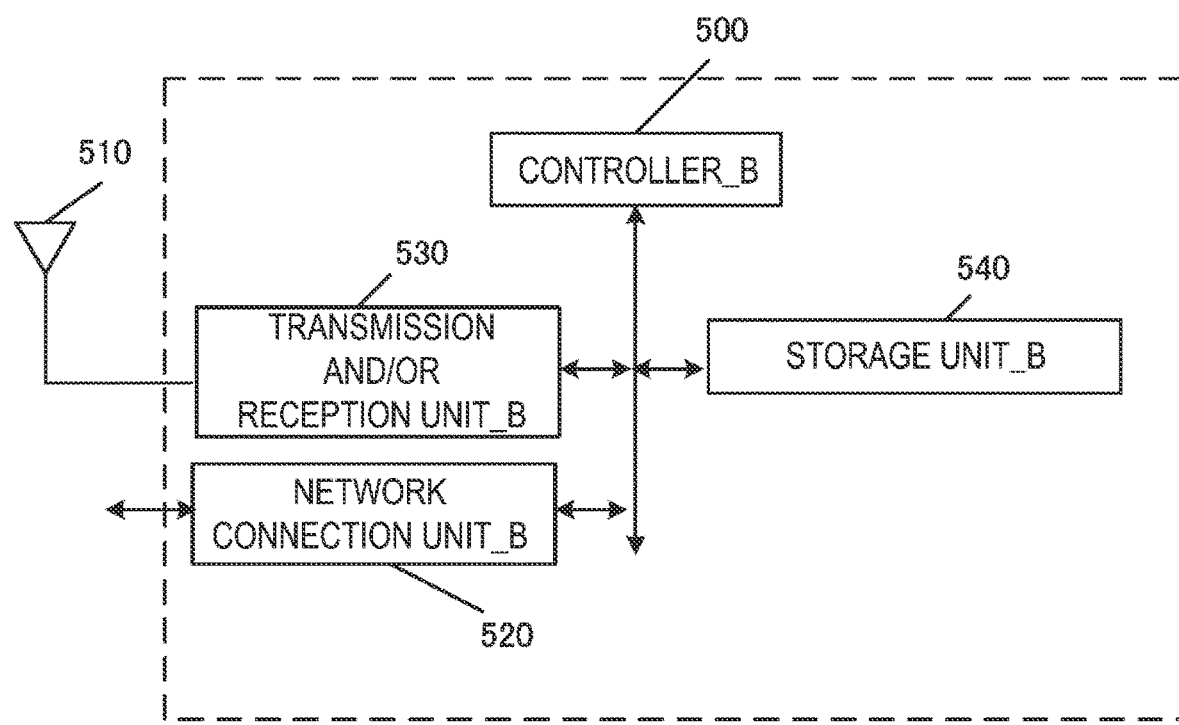
FIG. 4 is a diagram illustrating a configuration of an access network apparatus (gNB) in the 5GS.

Next, an apparatus configuration example of the gNB will be described with reference to FIG. 4. The gNB includes a controller_B 500, an antenna 510, a network connection unit B 520, a transmission and/or reception unit B 530, and a storage unit_B 540. The controller_B 500, the network connection unit B 520, the transmission and/or reception unit B 530, and the storage unit_B 540 are connected via a bus. The transmission and/or reception unit B 530 connects to the antenna 510.

The controller_B 500 is a function unit that controls the entire operations and functions of the gNB. The controller_B 500 reads and performs various programs stored in the storage unit_B 540 as necessary, and thereby implements various types of processing in the gNB.

The network connection unit B 520 is a function unit for the gNB to communicate with the AMF and/or the UPF. In other words, with the use of the network connection unit B 520, the gNB can transmit and/or receive user data and/or control information to and/or from the AMF and/or the UPF.

The transmission and/or reception unit B 530 is a function unit for performing radio communication with the UE via the antenna 510. In other words, with the use of the transmission and/or reception unit_B 530, the gNB can transmit and/or receive user data and/or control information to and/or from the UE.

Following is a detailed description with reference to FIG. 2. With the use of the network connection unit B 520, the gNB in the 5G AN can communicate with the AMF over the N2 interface and can communicate with the UPF over the N3 interface. The gNB can communicate with the UE with the use of the transmission and/or reception unit B 530.

The storage unit_B 540 is a function unit for storing programs, user data, control information, and the like necessary for each operation of the gNB. The storage unit 540 may have a function of storing control information transmitted and/or received to and/or from the UE and another access network apparatus (base station apparatus), core network apparatus, and DN.

2.3. Apparatus Configuration of AMF

Figure 5:
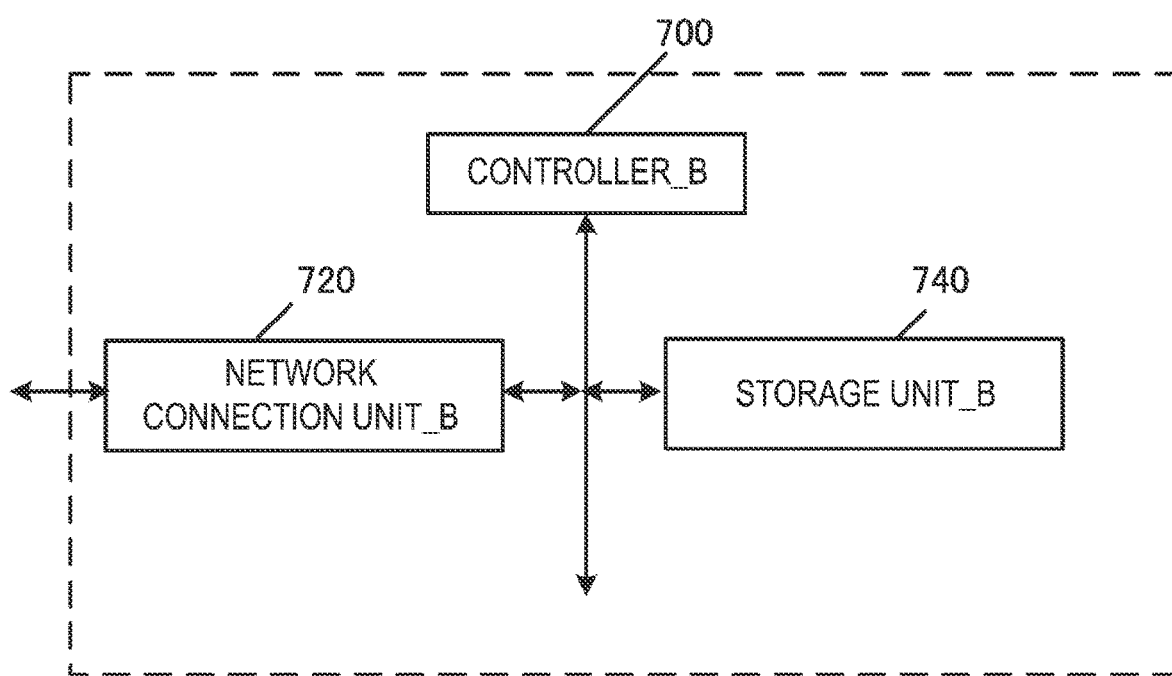
FIG. 5 is a diagram illustrating a configuration of a core network apparatus (AMF/SMF/UPF) in the 5GS.

Next, an apparatus configuration example of the AMF will be described with reference to FIG. 5. The AMF includes a controller B 700, a network connection unit B 720, and a storage unit_B 740. The controller_B 700, the network connection unit B 720, and the storage unit_B 740 are connected via a bus. The AMF may be a node that handles the control plane.

The controller_B 700 is a function unit that controls the entire operations and functions of the AMF. The controller_B 700 reads and performs various programs stored in the storage unit_B 740 as necessary, and thereby implements various types of processing in the AMF.

The network connection unit_B720 is a function unit for the AMF to connect to the base station apparatus (gNB), and/or the SMF, and/or the PCF, and/or the UDM, and/or the SCEF, and/or the NSACF in the 5G AN. In other words, with the use of the network connection unit_B 720, the AMF can transmit and/or receive user data and/or control information to and/or from the base station apparatus (gNB), and/or the SMF, and/or the PCF, and/or the UDM, and/or the SCEF in the 5G AN.

Following is a detailed description with reference to FIG. 2. With the use of the network connection unit A 620, the AMF in the 5GCN can communicate with the gNB over the N2 interface, can communicate with the UDM over the N8 interface, can communicate with the SMF over the N11 interface, and can communicate with the PCF over the N15 interface. The AMF can transmit and/or receive a NAS message to and/or from the UE over the N1 interface with the use of the network connection unit A 620. Note that the N1 interface is a logical interface, and thus communication between the UE and the AMF is actually performed over the 5G AN. In a case that the AMF supports the N26 interface, the AMF can communicate with the MME over the N26 interface with the use of the network connection unit A 620.

The storage unit_B 740 is a function unit for storing programs, user data, control information, and the like necessary for each operation of the AMF. The storage unit 740 may have a function of storing control information transmitted and/or received to and/or from the UE, the access network apparatus, and another core network apparatus and DN.

Note that the AMF has a function of exchanging a control message with the RAN using the N2 interface, a function of exchanging a NAS message with the UE using the N1 interface, a function of performing encryption and integrity protection of a NAS message, a Registration management (RM) function, a Connection management (CM) function, a Reachability management function, a Mobility management function for the UE or the like, a function of transferring a Session Management (SM) message between the UE and the SMF, an Access Authentication (Access Authorization) function, a security anchor function (Security Anchor Functionality (SEA)), a Security Context Management (SCM) function, a function of supporting the N2 interface for a Non-3GPP Interworking Function (N3IWF), a function of supporting transmission and/or reception of a NAS signal with the UE via the N3IWF, a function of authenticating the UE connected via the N3IWF, and the like.

In registration management, an RM state for each UE is managed. The RM state may be synchronized between the UE and the AMF. The RM state includes a deregistered state (RM-DEREGISTERED state) and a registered state (RM-REGISTERED state). In the RM-DEREGISTERED state, the UE is not registered in the network, and thus the AMF is in a state of being unable to reach the UE, because a UE context in the AMF does not have valid location information and routing information for the UE. In the RM-REGISTERED state, the UE is registered in the network, and thus the UE can receive a service that requires registration in the network. Note that the RM state may be referred to as a 5GMM state. In this case, the RM-DEREGISTERED state may be referred to as a 5GMM-DEREGISTERED state, and the RM-REGISTERED state may be referred to as a 5GMM-REGISTERED state.

In other words, 5GMM-REGISTERED may be a state in which each apparatus establishes a 5GMM context, or may be a state in which each apparatus establishes a PDU session context. Note that, in a case that each apparatus is 5GMM-REGISTERED, the UE_A 10 may start transmission and/or reception of user data and a control message, or may respond to paging. In addition, note that, in a case that each apparatus is 5GMM-REGISTERED, the UE_A 10 may perform a registration procedure other than a registration procedure for initial registration, and/or a service request procedure.

In addition, 5GMM-DEREGISTERED may be a state in which each apparatus does not establish the 5GMM context, may be a state in which the location information of the UE_A 10 is not known to the network, or may be a state in which the network is in a state of being unable to reach the UE_A 10. Note that, in a case that each apparatus is 5GMM-DEREGISTERED, the UE_A 10 may initiate the registration procedure, or may perform the registration procedure to thereby establish the 5GMM context.

In connection management, a CM state for each UE is managed. The CM state may be synchronized between the UE and the AMF. The CM state includes a non-connected state (CM-IDLE state) and a connected state (CM-CONNECTED state). In the CM-IDLE state, the UE is in the RM-REGISTERED state, but does not have NAS signaling connection established with the AMF via the N1 interface. In the CM-IDLE state, the UE does not have connection of the N2 interface (N2 connection) and connection of the N3 interface (N3 connection). In contrast, in the CM-CONNECTED state, the UE has NAS signaling connection established with the AMF via the N1 interface. In the CM-CONNECTED state, the UE may have connection of the N2 interface (N2 connection) and/or connection of the N3 interface (N3 connection).

In addition, in connection management, management may be performed separately for the CM state in 3GPP access and the CM state in non-3GPP access. In this case, the CM state in 3GPP access may include a non-connected state in 3GPP access (CM-IDLE state over 3GPP access) and a connected state in 3GPP access (CM-CONNECTED state over 3GPP access). In addition, the CM state in non-3GPP access may include a non-connected state in non-3GPP access (CM-IDLE state over non-3GPP access) and a connected state in non-3GPP access (CM-CONNECTED state over non-3GPP access). Note that the non-connected state may be referred to as an idle mode, and a connected state mode may be referred to as a connected mode.

Note that the CM state may be referred to as a 5GMM mode. In this case, the non-connected state may be referred to as a 5GMM non-connected mode (5GMM-IDLE mode), and the connected state may be referred to as a 5GMM connected mode (5GMM-CONNECTED mode). In addition, the non-connected state in 3GPP access may be referred to as a 5GMM non-connected mode in 3GPP access (5GMM-IDLE mode over 3GPP access), and the connected state in 3GPP access may be referred to as a 5GMM connected mode in 3GPP access (5GMM-CONNECTED mode over 3GPP access). In addition, the non-connected state in non-3GPP access may be referred to as a 5GMM non-connected mode in non-3GPP access (5GMM-IDLE mode over non-3GPP access), and the connected state in non-3GPP access may be referred to as a 5GMM connected mode in non-3GPP access (5GMM-CONNECTED mode over non-3GPP access). Note that the 5GMM non-connected mode may be referred to as an idle mode, and the 5GMM connected mode may be referred to as a connected mode.

One or more AMFs may be deployed in the core network B. The AMF may be a Network Function (NF) that manages one or more Network Slice Instances (NSIs). The AMF may be a common CP function (Common Control Plane Network Function (CPNF) (CCNF)) shared among multiple NSIs.

Note that, in a case that the UE connects to the 5GS over non-3GPP access, the N3IWF is an apparatus deployed and/or a function allocated between non-3GPP access and the 5GCN.

2.4. Apparatus Configuration of SMF

Next, an apparatus configuration example of the SMF will be described with reference to FIG. 5. The SMF includes a controller B 700, a network connection unit_B 720, and a storage unit_B 740. The controller_B 700, the network connection unit_B 720, and the storage unit_B 740 are connected via a bus. The SMF may be a node that handles the control plane.

The controller_B 700 is a function unit that controls the entire operations and functions of the SMF. The controller_B 700 reads and performs various programs stored in the storage unit_B 740 as necessary, and thereby implements various types of processing in the SMF.

The network connection unit_B 720 is a function unit for the SMF to connect to the AMF, and/or the UPF, and/or the PCF, and/or the UDM. In other words, with the use of the network connection unit_B 720, the SMF can transmit and/or receive user data and/or control information to and/or from the AMF, and/or the UPF, and/or the PCF, and/or the UDM, and/or the NSACF.

Following is a detailed description with reference to FIG. 2. With the use of the network connection unit A 620, the SMF in the 5GCN can communicate with the AMF over the N11 interface, can communicate with the UPF over the N4 interface, can communicate with the PCF via the N7 interface, and can communicate with the UDM over the N10 interface.

The storage unit_B 740 is a function unit for storing programs, user data, control information, and the like necessary for each operation of the SMF.

The SMF has a Session Management function such as establishment, modification, and release of a PDU session, a function of IP address allocation to the UE and management thereof, a function of selection and control of the UPF, a function of configuring the UPF for routing traffic to an appropriate destination (transmission destination), a function of transmitting and/or receiving an SM part of a NAS message, a function of issuing a notification about arrival of downlink data (Downlink Data Notification), a function of providing SM information specific to the AN (for each AN) that is transmitted to the AN through the AMF over the N2 interface, a function of determining a Session and Service Continuity mode (SSC mode) for a session, a roaming function, and the like.

The storage unit 740 may have a function of storing control information transmitted and/or received to and/or from the UE, the access network apparatus, and another core network apparatus and DN.

2.5. Apparatus Configuration of UPF

Next, an apparatus configuration example of the UPF will be described with reference to FIG. 5. The UPF includes a controller B 700, a network connection unit_B 720, and a storage unit_B 740. The controller_B 700, the network connection unit_B 720, and the storage unit_B 740 are connected via a bus. The UPF may be a node that handles the control plane.

The controller_B 700 is a function unit that controls the entire operations and functions of the UPF. The controller_B 700 reads and performs various programs stored in the storage unit_B 740 as necessary, and thereby implements various types of processing in the UPF.

The network connection unit_B 720 is a function unit for the UPF to connect to the base station apparatus (gNB), and/or the SMF, and/or the DN in the 5G AN. In other words, with the use of the network connection unit_B 720, the UPF can transmit and/or receive user data and/or control information to and/or from the base station apparatus (gNB), and/or the SMF, and/or the DN in the 5G AN.

Following is a detailed description with reference to FIG. 2. With the use of the network connection unit A 620, the UPF in the 5GCN can communicate with the gNB over the N3 interface, can communicate with the SMF over the N4 interface, can communicate with the DN over the N6 interface, and can communicate with another UPF over the N9 interface.

The storage unit_B 740 is a function unit for storing programs, user data, control information, and the like necessary for each operation of the UPF.

The UPF has a function as an anchor point for intra-RAT mobility or inter-RAT mobility, a function as an external PDU session point to be mutually connected with the DN (that is, a function of transferring user data as a gateway between the DN and the core network_B), a function of routing and transferring packets, an Uplink Classifier (UL CL) function of supporting routing of multiple traffic flows for one DN, a Branching point function of supporting a multi-homed PDU session, a Quality of Service (QoS) processing function for the user plane, a function of verifying uplink traffic, a function of triggering buffering of downlink packets and Downlink Data Notification, and the like.

The UPF may be a gateway for IP communication and/or non-IP communication. The UPF may have a function of transferring IP communication, or a function of conversion between non-IP communication and IP communication. In addition, multiple deployed gateways may be gateways for connecting the core network_B and a single DN. Note that the UPF may have connectivity with another NF, and may connect to each apparatus via another NF.

The storage unit 740 may have a function of storing control information transmitted and/or received to and/or from the UE, the access network apparatus, and another core network apparatus and DN.

Note that the user plane (also referred to as a UP) refers to user data that is transmitted and/or received between the UE and the network. The user plane may be transmitted and/or received using a PDN connection in a case of 4G, or a PDU session in a case of 5G. In addition, in a case of the EPS, the user plane may be transmitted and/or received using the LTE-Uu interface, and/or the S1-U interface, and/or the S5 interface, and/or the S8 interface, and/or the SGi interface. In addition, in a case of the 5GS, the user plane may be transmitted and/or received over the interface between the UE and the NG RAN, and/or the N3 interface, and/or the N9 interface, and/or the N6 interface. The user plane may be hereinafter referred to as a U-Plane.

In addition, the control plane (also referred to as a CP) refers to a control message that is transmitted and/or received in order to perform communication control of the UE or the like. The control plane may be transmitted and/or received using Non-Access-Stratum (NAS) signaling connection between the UE and the MME. The control plane may be transmitted and/or received by using the Non-Access-Stratum (NAS) signaling connection between the UE and the AMF. In addition, in a case of the EPS, the control plane may be transmitted and/or received using the LTE-Uu interface and the S1-MME interface. In addition, in a case of the 5GS, the control plane may be transmitted and/or received using the interface between the UE and the NG RAN and the N2 interface. The control plane may be hereinafter referred to as a control plane, or may be hereinafter referred to as a C-Plane.

In addition, the User Plane (U-Plane (UP)) may be a communication path for transmitting and/or receiving user data, and may include multiple bearers. In addition, the Control Plane (C-Plane (CP)) may be a communication path for transmitting and/or receiving a control message, and may include multiple bearers.

2.6. Description of Other Apparatuses and/or Functions and Identification Information According to Present Embodiment Next, other apparatuses and/or functions and identification information will be described.

A network refers to at least some of the access network B, the core network B, and the DN. One or more apparatuses included in at least a part of the access network_B, the core network_B, and the DN may be referred to as a network or a network apparatus. In other words, "a network transmits and/or receives a message and/or performs processing" may mean "an apparatus (a network apparatus and/or a control apparatus) in the network transmits and/or receives the message and/or performs the processing". Conversely, "an apparatus in a network transmits and/or receives a message and/or performs processing" may mean "the network transmits and/or receives the message and/or performs the processing".

A Network Slice Selection Function (NSSF) may be a network function (also referred to as an NF) having a function of selecting a network slice serving the UE.

A Network Data Analytics Function (NWDAF) may be an NF having a function of performing data collection from an NF and an application function (also referred to as an AF).

A Policy Control Function (PCF) may be an NF having a function of determining a policy for controlling a behavior of a network.

A Network Repository Function (NRF) may be an NF having a service discovery function. The NRF may be an NF that, in a case of receiving a discovery request of another NF from a certain NF, provides information of the discovered NF.

The Network Slice Admission Control Function (NSACF) may have a function of monitoring and controlling the number of UEs registered per NS and/or the number of PDU sessions per NS regarding the network slice (NS) related to Network Slice Admission Control (NSAC). The NSACF may be configured using the maximum number of UEs per NS and/or the maximum number of PDU sessions per NS allowed for each NS related to NSAC. The NSACF may have a function of increasing and decreasing the number of UEs registered with a certain NS so that the number does not exceed the maximum number of UEs allowed to be registered with the NS. The NSACF may maintain a list of UE IDs registered with the NS related to NSAC. The NSACF may have the following function: in a case that the number of UEs registered with the NS is increased (for example, in a case that a certain UE newly transmits a registration request message to the NS), the NSACF confirms whether the ID of the UE is already included in the list of UE IDs registered with the NS, and in a case that the ID of the UE is not included in the list, the NSACF further confirms whether the maximum number of UEs per NS is reached for the NS. In a case that a registration status of the UE for the NS related to NSAC changes during the registration procedure, and/or the de-registration procedure, and/or the NSSAA procedure, and/or the like, the AMF may make a request related to the maximum number of UEs per NS to the NSACF. The NSACF may have a function of increasing and decreasing the number of PDU sessions for a certain NS so that the number does not exceed the maximum number of PDU sessions allowed for the NS. The NSACF may have the following function: in a case that the number of PDU sessions using the NS is increased (for example, in a case that a certain UE transmits a PDU session establishment request message for the NS), the NSACF confirms whether the maximum number of UEs per NS is reached for the NS. The SMF may make a request related to the maximum number of PDU sessions per NS to the NSACF during the PDU session establishment procedure, and/or the PDU session release procedure.

A session management (SM) message (also referred to as a Non-Access-Stratum (NAS) SM message) may be a NAS message used in a procedure for SM, or may be a control message transmitted and/or received between the UE_A 10 and the SMF_A 230 via the AMF A 240. Furthermore, the SM message may include a PDU session establishment request message, a PDU session establishment accept message, a PDU session reject message (PDU session establishment reject message), a PDU session modification request message, a PDU session modification command message, a PDU session modification complete message (PDU session modification complete), a PDU session modification command reject message, a PDU session modification reject message, a PDU session release request message, a PDU session release reject message, a PDU session release command message, a PDU session release complete message, and the like.

An SM procedure (also referred to as a procedure for SM) may include a PDU session establishment procedure, a PDU session modification procedure, and a PDU session release procedure (UE-requested PDU session release procedure). Note that each procedure may be a procedure initiated by the UE, or may be a procedure initiated by the NW.

A Mobility management (MM) message (also referred to as a NAS MM message) may be a NAS message used in a procedure for MM, or may be a control message transmitted and/or received between the UE_A 10 and the AMF A 240. Furthermore, the MM message may include a Registration request message, a Registration Accept message, a Registration reject message, a De-registration request message, a De-registration accept message, a configuration update command message, a configuration update complete message, a Service request message, a Service accept message, a Service reject message, a Notification message, a Notification response message, and the like.

An MM procedure (also referred to as a procedure for MM) may include a Registration procedure, a De-registration procedure (also referred to as a de-registration procedure), a Generic UE configuration update procedure, an authentication and authorization procedure, a Service request procedure, a Paging procedure, and a Notification procedure.

A 5G System (5GS) service may be a connection service provided using the core network_B 190. In addition, the 5GS service may be a service different from an EPS service, or may be a service similar to the EPS service.

A non 5GS service may be a service other than the 5GS service and may include an EPS service and/or a non EPS service.

A Packet Data Network (PDN) type indicates a type of PDN connection and includes IPv4, IPv6, IPv4v6, and non-IP. In a case that IPv4 is specified, it is indicated that transmission and/or reception of data is performed using IPv4. In a case that IPv6 is specified, it is indicated that transmission and/or reception of data is performed using IPv6. In a case that IPv4v6 is specified, it is indicated that transmission and/or reception of data is performed using IPv4 or IPv6. In a case that non-IP is specified, it is indicated that communication is performed using a communication method other than the IP, not communication using the IP.

Although a Protocol Data Unit (PDU) session can be defined as a relationship between the DN that provides a PDU connectivity service and the UE, the PDU session may be connectivity established between the UE and an external gateway. In the 5GS, the UE establishes a PDU session via the access network_B and the core network_B, and can thereby perform transmission and/or reception of user data to and/or from the DN by using the PDU session. Here, the external gateway may be a UPF, an SCEF, or the like. The UE can perform transmission and/or reception of user data to and/or from an apparatus deployed in the DN, such as an application server, by using a PDU session.

The MA PDU session may be a PDU session that provides PDU connectivity service, using 3GPP access and/or non-3GPP access.

Note that each apparatus (the UE, and/or the access network apparatus, and/or the core network apparatus) may associate one or more pieces of identification information with PDU session(s) for management. Note that these pieces of identification information may include one or more of a DNN, a QoS rule, a PDU session type, application identification information, NSI identification information, and access network identification information, and may further include other pieces of information. In addition, in a case that multiple PDU sessions are established, pieces of identification information associated with the PDU sessions may have the same or different contents.

The Data Network Name (DNN) may be identification information for identifying the core network and/or an external network such as the DN. In addition, the DNN can also be used as information for selecting a gateway such as the PGW A 30/UPF A 235 connecting the core network B 190. In addition, the DNN may correspond to an Access Point Name (APN).

A Protocol Data Unit/Packet Data Unit (PDU) session type indicates a type of PDU session and includes IPv4, IPv6, Ethernet, and Unstructured. In a case that IPv4 is specified, it is indicated that transmission and/or reception of data is performed using IPv4. In a case that IPv6 is specified, it is indicated that transmission and/or reception of data is performed using IPv6. In a case that Ethernet is specified, it is indicated that transmission and/or reception of an Ethernet frame is performed. Alternatively, Ethernet may indicate that communication using the IP is not performed. In a case that Unstructured is specified, it is indicated that data is transmitted and/or received to and/or from an application server in the DN or the like by using a Point-to-Point (P2P) tunneling technique. For the P2P tunneling technique, for example, a UDP/IP encapsulation technique may be used. Note that the PDU session type may include the IP, in addition to the above. The IP can be specified in a case that the UE can use both of IPv4 and IPv6.

The Public land mobile network (PLMN) is a communication network that provides mobile radio communication services. The PLMN is a network managed by an operator who is a network operator, and the operator can be identified by a PLMN ID. A PLMN that matches a Mobile Network Code (MNC) and a Mobile Country Code (MCC) of an International Mobile Subscriber Identity (IMSI) of the UE may be a Home PLMN (HPLMN). Furthermore, the UE may hold, in the USIM, an Equivalent HPLMN list for identifying one or multiple Equivalent HPLMNs (EPLMNs). A PLMN different from the HPLMN and/or the EPLMN may be a VPLMN (Visited PLMN). A PLMN with which the UE has been successfully registered may be a Registered PLMN (RPLMN). Note that a service provided by the PLMN may be referred to as a PLMN service, and a service provided by an SNPN may be referred to as an SNPN service.

A network slice (NS) is a logical network that provides specific network capability and network characteristics. The UE and/or the network can support the network slice (NW slice (NS)) in the 5GS. The network slice may simply be referred to as a slice.

A network slice instance (NSI) includes a set of an instance (entity) of a network function (NF) and necessary resources and forms a network slice to be allocated. Here, the NF is a processing function in a network, and is adopted or defined in 3GPP. The NSI is an entity of one or more NSs configured in the core network B. The NSI may include a virtual Network Function (NF) generated using a Network Slice Template (NST). Here, the NST is associated with a resource request for provision of a requested communication service and capability, and is a logical expression of one or more NFs. In other words, the NSI may be a set of multiple NFs in the core network_B 190. The NSI may be a logical network configured for classifying user data to be delivered depending on a service or the like. In the NS, one or more NFs may be configured. The NF configured in the NS may or may not be an apparatus shared with another NS. The UE and/or the apparatus in the network can be allocated to one or more NSs, based on an NSSAI, and/or an S-NSSAI, and/or a UE usage type, and/or registration information such as one or more NSI IDs, and/or an APN. Note that the UE usage type is a parameter value included in registration information of the UE, which is used for identifying the NSI. The UE usage type may be stored in the HSS. The AMF may select the SMF and the UPF, based on the UE usage type.

The Single Network Slice Selection Assistance Information (S-NSSAI) is information for identifying the NS. The S-NSSAI may include only a Slice/Service type (SST), or may include an SST and a Slice Differentiator (SD). Here, the SST is information indicating operation of the NS expected in terms of functions and services. The SD may be information for interpolating an SST in a case of selecting one NSI out of multiple NSIs indicated by the SST. The S-NSSAI may be information unique to each PLMN or may be standard information common to the PLMNs. The network may store one or more S-NSSAIs in the registration information of the UE as default S-NSSAIs. Note that, in a case that the S-NSSAI is a default S-NSSAI, and the UE does not transmit to a network a valid S-NSSAI in a registration request message, the network may provide an NS related to the UE.

The Network Slice Selection Assistance Information (NSSAI) is a set of S-NSSAIs. Each S-NSSAI included in the NSSAI is information for assisting the access network or the core network to select the NSI. The UE may store the NSSAI allowed by the network for each PLMN. The NSSAI may be information used for selecting the AMF.

The configured NSSAI (also referred to as Configured NSSAI) is an NSSAI that can be applied to one or more PLMNs or SNPNs, and is an NSSAI provided for and stored in the UE. The UE may store the configured NSSAI for each PLMN, or may store the configured NSSAI for each NPN (hereinafter the SNPN and/or the PNI-NPN may be collectively referred to as NPN). The configured NSSAI may be information configured by the network (the PLMN or the SNPN). The S-NSSAI included in the configured NSSAI may be represented as configured S-NSSAI. The configured S-NSSAI may include S-NSSAI and mapped S-NSSAI. The configured NSSAI may include a configured NSSAI stored in the UE, and a configured NSSAI transmitted from the network to the UE.

The requested NSSAI (also referred to as Requested NSSAI) is an NSSAI provided from the UE to the network (current PLMN (also referred to as a serving PLMN or a current PLMN) or NPN (also referred to as a serving NPN or a current NPN)) during the registration procedure. The S-NSSAI included in the requested NSSAI may be an S-NSSAI selected from one or more S-NSSAIs included in the configured NSSAI and/or the allowed NSSAI associated with the current PLMN or NPN. The S-NSSAI included in the requested NSSAI may be an S-NSSAI selected so as not to include one or more S-NSSAIs included in the pending NSSAI and/or the rejected NSSAI. The requested NSSAI may be information indicating a network slice that the UE wants to be registered with or access to. The S-NSSAI included in the requested NSSAI may be referred to as a requested S-NSSAI. The requested NSSAI may be included in a Non-Access-Stratum (NAS) message, such as a registration request message, and/or a Radio Resource Control (RRC) message including the NAS message transmitted from the UE to the network (the PLMN or the SNPN). The requested NSSAI may include a requested NSSAI stored in the UE, and a requested NSSAI transmitted from the UE to the network (the PLMN or the SNPN).

The allowed NSSAI (also referred to as Allowed NSSAI) is information indicating one or multiple network slices allowed for the UE. In other words, the allowed NSSAI may be information identifying a network slice to which the UE is allowed by the network to connect. The allowed NSSAI may be information indicating one or more S-NSSAIs available in the current PLMN or SNPN in the current registration area. As information of the UE, each of the UE and the network stores and manages the allowed NSSAI for each access (3GPP access or non-3GPP access). The S-NSSAI included in the allowed NSSAI may be represented as an allowed S-NSSAI. The allowed S-NSSAI may include the S-NSSAI and the mapped S-NSSAI. The allowed NSSAI may include an allowed NSSAI stored in the UE, and an allowed NSSAI transmitted from the network to the UE.

The mapped S-NSSAI (also referred to as Mapped S-NSSAI) may be an S-NSSAI of the HPLMN mapped to the S-NSSAI of a registered PLMN in a roaming scenario. Basically, the mapped S-NSSAI may be an S-NSSAI used in a case that the UE is roaming, or may be an S-NSSAI not used in a case that the UE is not roaming (also referred to as a case of non-roaming). The UE may store one or multiple mapped S-NSSAIs mapped to the configured NSSAI and the S-NSSAI included in the Allowed NSSAI of each access type. The UE may store one or multiple mapped S-NSSAIs included in the rejected NSSAI, or mapped S-NSSAIs corresponding to the S-NSSAI included in the rejected NSSAI. The mapped NSSAI may include a mapped NSSAI stored in the UE, and a mapped NSSAI transmitted from the network to the UE.

The rejected NSSAI (also referred to as Rejected NSSAI) is information indicating one or multiple network slices not allowed for the UE. In other words, the rejected NSSAI is information identifying a network slice to which the UE is not allowed by the network to connect. The rejected NSSAI may be information including one or multiple combinations of an S-NSSAI and a reject cause value (hereinafter also referred to as a cause value or a reject cause). Here, the reject cause value is information indicating why the network rejects the corresponding S-NSSAI. The UE and the network may each appropriately store and manage the rejected NSSAI based on the reject cause value associated with each S-NSSAI. Furthermore, the rejected NSSAI may be included in the NAS message transmitted from the network to the UE, such as the registration accept message, the configuration update command, the registration reject message, or in the RRC message including the NAS message. The S-NSSAI included in the rejected NSSAI may be represented as a rejected S-NSSAI. Here, the rejected NSSAI may mean one of the first to fourth rejected NSSAIs. The rejected S-NSSAI may mean the rejected S-NSSAI included in one of the first to fourth rejected NSSAIs. The rejected NSSAI may be one of the first to fourth rejected NSSAIs and the pending NSSAI, or may be a combination of these. The S-NSSAI included in the rejected NSSAI may be represented as a rejected S-NSSAI. The rejected S-NSSAI may include the S-NSSAI and the mapped S-NSSAI.

Here, the first rejected NSSAI may be the rejected NSSAI for the current PLMN or SNPN. In other words, the first rejected NSSAI may be the NSSAI not available in the current PLMN or SNPN. The first rejected NSSAI may be a set of one or more S-NSSAIs not available in the current PLMN or SNPN among the S-NSSAIs included in the requested NSSAI by the UE. The first rejected NSSAI may be rejected NSSAI for current PLMN or SNPN in the 5GS. The first rejected S-NSSAI may be rejected S-NSSAI for current PLMN or SNPN, or may be the S-NSSAI included in the rejected NSSAI for current PLMN or SNPN. The first rejected NSSAI may be a rejected NSSAI stored by the UE and/or the NW, or may be a rejected NSSAI transmitted from the NW to the UE. In a case that the first rejected NSSAI is a rejected NSSAI transmitted from the NW to the UE, the first rejected NSSAI may be information including one or multiple combinations of an S-NSSAI and a cause value. The reject cause value may indicate "an S-NSSAI not available in the current PLMN or SNPN", which means that the S-NSSAI associated with the reject cause value is not available in the current PLMN or SNPN.

The first rejected NSSAI may be valid in the entire registered PLMN or registered SNPN. In other words, the UE and/or NW may treat the first rejected NSSAI and the S-NSSAI included in the first rejected NSSAI as information not dependent on the access type. In other words, the first rejected NSSAI may be information valid for 3GPP access and non-3GPP access.

In a case that the UE transitions to a deregistered state on both 3GPP access and non-3GPP access for the current PLMN or SNPN, the UE may delete the first rejected NSSAI from the storage. In other words, in a case that the UE transitions to the deregistered state for the current PLMN or SNPN via one access, or successfully registers with a new PLMN or SNPN via one access, or fails to register with a new PLMN via one access and transitions to the deregistered state, and further that the UE is not registered (deregistered state) via the other access, then the UE may delete the first rejected NSSAI.

The S-NSSAI included in the first rejected NSSAI in the storage unit of the UE may be handled as unavailable in the entire current PLMN or SNPN. In other words, the UE may be forbidden from performing the MM procedure and/or the SM procedure using the S-NSSAI in the entire current PLMN or SNPN.

The second rejected NSSAI may be the rejected NSSAI for the current registration area. In other words, the second rejected NS SAI may be the NSSAI not available in the current registration area. The second rejected NSSAI may be a set of one or multiple S-NSSAIs not available in the current registration area among the S-NSSAIs included in the requested NSSAI by the UE. The second rejected NSSAI may be rejected NSSAI for the current registration area in the 5GS. The second rejected NSSAI may be a rejected NSSAI stored by the UE and/or the NW, or may be a rejected NSSAI transmitted from the NW to the UE. In a case that the second rejected NSSAI is the rejected NSSAI transmitted from the NW to the UE, the second rejected NSSAI may be information including one or multiple combinations of an S-NSSAI and a cause value. The cause value may indicate "an S-NSSAI not available in the current registration area", which means that the S-NSSAI associated with the cause value is not available in the current registration area.

The second rejected NSSAI may be valid in the current registration area. In other words, the UE and/or the NW may treat the second rejected NSSAI and the S-NSSAI included in the second rejected NSSAI as information for each access type. In other words, the second rejected NSSAI may be information valid for each of 3GPP access and non-3GPP access. In other words, once the UE transitions to the deregistered state for one access, the UE may delete the second rejected NSSAI from the storage.

The S-NSSAI included in the second rejected NSSAI in the storage unit of the UE may be handled as unavailable in the current registration area. In other words, the UE may be forbidden from performing the MM procedure and/or the SM procedure using the S-NSSAI in the current registration area.

The third rejected NSSAI is a set of one or multiple S-NSSAIs that require NSSAA and for which the NSSAA fails or is revoked. The third rejected NSSAI may be an NSSAI stored by the UE and/or the NW, or may be transmitted from the NW to the UE. In a case that the third rejected NSSAI is transmitted from the NW to the UE, the third rejected NSSAI may be information including one or multiple combinations of an S-NSSAI and a reject cause value. The reject cause value in this case may be "S-NSSAI not available due to failure or revocation of NSSAA (S-NSSAI is not available due to the failed or revoked network slice-specific authorization and authentication)", and may be information indicating that the NSSAA for the S-NSSAI associated with the reject cause value has failed or has been revoked.

The third rejected NSSAI is valid in the entire registered PLMN. In other words, the UE and/or the NW may treat the third rejected NSSAI and S-NSSAI included in the third rejected NSSAI as information not dependent on the access type. In other words, the third rejected NSSAI may be valid information for 3GPP access and non-3GPP access. The third rejected NSSAI may be NSSAI different from the rejected NSSAI. The third rejected NSSAI may be the first rejected NSSAI.

The third rejected NSSAI is a rejected NSSAI allowing the UE to identify the slice that is rejected due to failure or revocation of NSSAA from the core network. Specifically, the UE does not initiate the registration request procedure for the S-NSSAI included in the third rejected NSSAI while storing the third rejected NSSAI. The third rejected NSSAI may be identification information including one or multiple S-NSSAIs received from the core network in association with the reject cause value indicating failure of NSSAA. The third rejected NSSAI is information not dependent on the access type. Specifically, in a case of storing the third rejected NSSAI, the UE need not attempt to transmit, either on 3GPP access or on non-3GPP access, the registration request message including the S-NSSAI included in the third rejected NSSAI. Alternatively, the UE can transmit the registration request message including the S-NSSAI included in the third rejected NSSAI, based on a UE policy. Alternatively, the UE may delete the third rejected NSSAI based on the UE policy, and transition to a state in which the UE can transmit the registration request message including the S-NSSAI included in the third rejected NSSAI. In other words, in a case of transmitting, based on the UE policy, the registration request message including the S-NSSAI included in the third rejected NSSAI, the UE may delete the S-NSSAI from the third rejected NSSAI.

The S-NSSAI included in the third rejected NSSAI in the storage unit of the UE may be handled as unavailable in the entire current PLMN or SNPN. In other words, the UE may be forbidden from performing the MM procedure and/or the SM procedure using the S-NSSAI in the current registration area.

The fourth rejected NSSAI may be the rejected NSSAI for the current tracking area. In other words, the fourth rejected NSSAI may be the NSSAI not available in the current tracking area.

The fourth rejected NSSAI may be the rejected NSSAI for the current tracking area in the current registration area. In other words, the fourth rejected NSSAI may be the NSSAI not available in the current tracking area in the current registration area.

The fourth rejected NSSAI may be the NSSAI not available in the current tracking area in the current registration area, and the NSSAI available in another tracking area in the current registration area.

The fourth rejected NSSAI may be the NSSAI not available in the current tracking area in the current registration area, and the NSSAI available in another tracking area in the current registration area, and another registration area (different from the current registration area).

The fourth rejected NSSAI may be a set of S-NSSAIs included in the requested NSSAI by the UE, and a set of S-NSSAIs not available in the current tracking area or S-NSSAIs transmitted using the reject cause indicating that the S-NSSAI is not available in the current tracking area by the AMF.

In the roaming scenario (during roaming), the fourth rejected NSSAI may include one or more S-NSSAIs for the current PLMN, and may include a set of mapped S-NSSAIs in a case of being available.

The fourth rejected NSSAI may be a rejected NSSAI stored by the UE and/or the NW, or may be a rejected NSSAI transmitted from the NW to the UE. In a case that the fourth rejected NSSAI is a rejected NSSAI transmitted from the NW to the UE, the fourth rejected NSSAI may be information including one or multiple combinations of an S-NSSAI and a cause value. The cause value may be twelfth identification information.

The fourth rejected NSSAI may be valid for 3GPP access and/or non-3GPP access. In other words, the UE and/or the NW may handle the fourth rejected NSSAI as that not dependent on the access type, or may handle the fourth rejected NSSAI as that dependent on the access type. In still other words, the UE and/or the NW may manage and/or store the fourth rejected NSSAI for each access type, or need not manage and/or store the fourth rejected NSSAI for each access type.

The pending NSSAI is a set of one or multiple S-NSSAIs that require network slice specific authentication by the network, for which the network slice specific authentication has not completed yet, and that are not available in the current PLMN. The pending NSSAI may be a Rejected NSSAI due to NSSAA or a pending NSSAI of the 5GS. The pending NSSAI may be a NSSAI stored by the UE or the NW, and may be an NSSAI transmitted from the NW to the UE. Note that the pending NSSAI is not limited to the rejected NSSAI and may be an NSSAI independent of the rejected NSSAI. In a case that the pending NS SAI is an NSSAI transmitted from the NW to the UE, the pending NSSAI may be information including one or multiple combinations of an S-NSSAI and a reject cause value. The reject cause value in this case may be "S-NSSAI pending for NSSAA (NSSAA is pending for the S-NSSAI)", or may be information indicating that the UE is forbidden from or awaiting (pending) using the S-NSSAI associated with the reject cause value until NSSAA for the S-NSSAI completes.

The pending NSSAI is valid in the entire registered PLMN. In other words, the UE and/or the NW may treat the third rejected NSSAI and the S-NSSAI included in the pending NSSAI as information not dependent on the access type. In other words, the pending NSSAI may be information valid for 3GPP access and non-3GPP access. The pending NSSAI may be NSSAI different from the rejected NSSAI. The pending NSSAI may be first rejected NSSAI.

The pending NSSAI is the NSSAI including one or multiple S-NSSAIs allowing the UE to identify the slice in which the procedure is pending. Specifically, while storing the pending NSSAI, the UE does not initiate the registration request procedure for the S-NSSAI included in the pending NSSAI. In other words, the UE does not use the S-NSSAI included in the pending NSSAI during the registration procedure until NSSAA for the S-NSSAI included in the pending NSSAI completes. The pending NS SAI is identification information including one or multiple S-NSSAIs received from the core network in association with the reject cause value indicating pending for NSSAA. The pending NSSAI is information not dependent on the access type. Specifically, in a case of storing the pending NSSAI, the UE attempts to transmit, neither on 3GPP access nor on non-3GPP access, the registration request message including the S-NSSAI included in the pending NSSAI.

A tracking area is a single or multiple ranges that can be expressed using the location information of the UE_A 10 managed by the core network. The tracking area may include multiple cells. In addition, the tracking area may be an area in which a control message such as paging is broadcast, or may be an area in which the UE_A 10 can move without performing a handover procedure. In addition, the tracking area (also referred to as Tracking Area or TA) may be a routing area, or may be a location area. The tracking area may be any area as long as the area is similar to these. The tracking area may be identified by a Tracking Area Identity (TAI) including a Tracking area code (TAC) and the PLMN.

The registration area is a set of one or multiple TAs allocated to the UE by the AMF. Note that while moving within one or multiple TAs included in the registration area, the UE_A 10 may be able to move without transmitting and/or receiving a signal for updating the tracking area. In other words, the registration area may be an information group indicating an area in which the UE_A 10 can move without performing the tracking area update procedure. The registration area may be identified with a TAI list including one or multiple TAIs.

A UE ID is information for identifying the UE. Specifically, the UE ID may be a SUbscription Concealed Identifier (SUCI), or a Subscription Permanent Identifier (SUPI), or a Globally Unique Temporary Identifier (GUTI), or an International Mobile Subscriber Identity (IIVIEI), or an IMEI Software Version (IMEISV), or a Temporary Mobile Subscriber Identity (TMSI), for example. Alternatively, the UE ID may be other information configured by an application or within the network. Moreover, the UE ID may be information for identifying the user.

Network Slice-Specific Authentication and Authorization (NSSAA) is a function for implementing network slice specific authentication and authorization. The network slice-specific authentication and authorization allows the UE to be authenticated and authorized outside the core network, such as in a 3rd Party. The PLMN and the network apparatus having the NSSAA function can perform an NSSAA procedure for a certain S-NSSAI, based on registration information of the UE. Further, the UE having the NSSAA function can manage and store the rejected NSSAI for pending for NSSAA and/or the rejected NSSAI for failure of NSSAA. NSSAA may be herein referred to as a network slice specific authentication and authorization procedure or an authentication and authorization procedure.

The S-NSSAI that requires NSSAA is an S-NSSAI that requires NSSAA managed by the core network and/or the core network apparatus. The core network and/or the core network apparatus may store the S-NSSAI that requires NSSAA by associating the S-NSSAI and information indicating whether or not NSSAA is required. In addition, the core network and/or the core network apparatus may store by associating the S-NSSAI that requires NSSAA and information indicating whether or not NSSAA has completed or information indicating NSSAA has completed and the state is an allowed or success state. The core network and/or the core network apparatus may manage the S-NSSAI that requires NSSAA as information unrelated to the access network.

The UE in a single registration mode has only one active MM state. In other words, the UE in the single registration mode is active only in either the RM state (5GMM state) in the 5GC or the EMM state in the EPC. The UE in the single registration mode is in a 5GC NAS mode in a case of connecting to the 5GC, and is in an EPC NAS mode in a case of connecting to the EPC. The UE in the single registration mode can be registered with only either the 5GC or the EPC, and thus needs to perform mapping between an EPS-GUTI (also referred to as a 4G-GUTI) and a 5G-GUTI in movement between the EPC and the 5GC.

The UE in a dual registration mode may be in a state in which the UE can be independently registered with the 5GC and the EPC. The UE in the dual registration mode can independently maintain the 5G-GUTI and the EPS-GUTI (also referred to as a 4G-GUTI).

The SNPN is a type of NPN being a 5GS deployed for non-public use, and is an NPN that is operated by an NPN operator and that is not dependent on the NF provided by the PLMN. The SNPN is identified by a combination of a PLMN ID and a Network Identifier (NID). The UE that can use the SNPN may support an SNPN access mode (also referred to as an SNPN access operation mode). The UE configured to operate in the SNPN access mode may be able to select the SNPN and be registered with the SNPN, or need not be able to select the PLMN. The UE configured to operate in the SNPN access mode may be able to perform an SNPN selection procedure, or need not be able to perform a PLMN selection procedure. The UE not configured to operate in the SNPN access mode although the UE can use the SNPN (SNPN enabled) need not be able to select the SNPN and be registered with the SNPN, or may be able to select the PLMN. The UE not configured to operate in the SNPN access mode need not be able to perform the SNPN selection procedure, or may be able to perform the PLMN selection procedure.

The UE operating in the SNPN access mode may be able to select the SNPN via Uu (3GPP access). The UE operating in the SNPN access mode may be able to select the SNPN via Uu or NWu established via a PDU session provided by the PLMN selected via Uu or NWu (non-3GPP access). The UE not operating in the SNPN access mode may be able to select the PLMN via Uu or NWu established via a PDU session provided by the SNPN selected via Uu or NWu (non-3GPP access).

Note that the SNPN access mode may be managed and/or applied in each access. In other words, the SNPN access mode may be managed and/or applied separately for 3GPP access and non-3GPP access. In other words, activation or deactivation of the SNPN access mode for 3GPP access and activation or deactivation of the SNPN access mode for non-3GPP access may be independent of each other. In other words, in a case that the SNPN access mode for 3GPP access is activated, the SNPN access mode for non-3GPP access may be activated or may be deactivated. In a case that the SNPN access mode for 3GPP access is deactivated, the SNPN access mode for non-3GPP access may be activated or may be deactivated.

Here, the SNPN access mode for 3GPP access may also be referred to as the SNPN access mode over 3GPP access or the SNPN access mode via 3GPP access.

The SNPN access mode for non-3GPP access may be referred to as the SNPN access mode over non-3GPP access or the SNPN access mode via non-3GPP access.

"To activate" may be interpreted as "to operate", and "to deactivate" may be interpreted as "not to operate". In other words, activation of the SNPN access mode for 3GPP access may mean to operate in the SNPN access mode for 3GPP access. Deactivation of the SNPN access mode for 3GPP access may mean not to operate in the SNPN access mode for 3GPP access. Activation of the SNPN access mode for non-3GPP access may mean to operate in the SNPN access mode for non-3GPP access. Deactivation of the SNPN access mode for non-3GPP access may mean not to operate in the SNPN access mode for non-3GPP access.

In a case that the UE roams between SNPNs, the SNPNs may be classified into a Home SNPN (also referred to as an HSNPN) and a Visited SNPN (also referred to as a VSNPN). Note that, in a case that the UE does not roam between the SNPNs, the SNPNs may be handled as being the same as the Home SNPN.

The Home SNPN may be an SNPN in which the UE can be registered as a home. The Home SNPN may be an SNPN that the UE selects first in SNPN selection. The Home SNPN may be an SNPN in which at least a part of information included in an SNPN identity (also referred to as an SNPN ID) matches at least a part of information included in an IMSI of the UE. The Home SNPN may be an SNPN in which the MCC and the MNC included in a PLMN Identity (also referred to as a PLMN ID) included in an SNPN identity (also referred to as an SNPN ID) match the MCC and the MNC included in the IMSI of the UE.

The Visited SNPN may be an SNPN in which the UE can be registered as other than a home. The Visited SNPN may be an SNPN in which the UE is not registered as a home. The Visited SNPN may be an SNPN that the UE does not select first in SNPN selection. The Visited SNPN may be an SNPN in which at least a part of information included in the SNPN identity (also referred to as an SNPN ID) does not match at least a part of information included in the IMSI of the UE. The Visited SNPN may be an SNPN in which the MCC and the MNC included in the PLMN Identity (also referred to as a PLMN ID) included in the SNPN identity (also referred to as an SNPN ID) do not match the MCC and the MNC included in the IMSI of the UE.

An equivalent HSNPN (also referred to as an equivalent Home SNPN or an EHSNPN) may be an SNPN considered to be equivalent to the current SNPN (here, the Home SNPN (also referred to as an HSNPN)) in SNPN selection, and/or cell selection, and/or cell reselection. The equivalent HSNPN may be one or more SNPNs included in an equivalent HSNPN list, or may be one or more SNPNs not included in an equivalent VSNPN list.

An equivalent VSNPN (also referred to as an equivalent Visited SNPN or an EVSNPN) may be an SNPN considered to be equivalent to the current SNPN (here, the Visited SNPN (also referred to as a VSNPN)) in SNPN selection, and/or cell selection, and/or cell reselection. The equivalent VSNPN may be one or more SNPNs included in the equivalent VSNPN list, or may be one or more SNPNs not included in the equivalent HSNPN list.

An equivalent SNPN (also referred to as an ESNPN) may be a concept including the equivalent HSNPN and/or the equivalent VSNPN. In other words, the ESNPN may indicate the equivalent HSNPN and/or the equivalent VSNPN.

The SNPN with which the UE has been successfully registered may be a Registered SNPN (RSNPN).

Next, in the present embodiment, identification information transmitted and/or received and stored and/or managed by each apparatus will be described.

Note that the UE, and/or the base station, and/or the AMF, and/or the SMF, and/or a core network apparatus or a network function other than these may store information in advance and generate new information as necessary. In a case that the information is transmitted and/or received between them, a receiving side may store the received information and perform a behavior based on the information.

3. First Embodiment

First, procedures used in a first embodiment will be described. The procedures used in the first embodiment may include the MM procedure and the SM procedure described above.

Note that, in the first embodiment, a case will be described as an example in which each of the combinations including the HSS and the UDM, the PCF and the PCRF, the SMF and the PGW-C, and the UPF and the PGW-U is configured as one and the same apparatus/function (that is, one and the same physical hardware, or one and the same logical hardware, or one and the same software) as illustrated in FIG. 2. However, the details described in the present embodiment can also be applied to a case that each of the combinations is configured as different apparatuses/functions (that is, different pieces of physical hardware, or different pieces of logical hardware, or different pieces of software). For example, between the apparatuses/functions, data may be directly transmitted and/or received, data may be transmitted and/or received via an N26 interface between the AMF and the MME, or data may be transmitted and/or received via the UE.

The AMF may determine an RAT type for NR satellite connection (NR satellite access). Here, the NR satellite connection may mean connection via a satellite using a communication function of NR and/or 5G performed between the UE and the core network. In other words, in a case that the UE connects to the network via satellite connection, the AMF may determine the RAT type. Note that, in the present specification, the NR satellite connection may be simply referred to as satellite connection. The NR satellite connection may include NR (LEO), NR (MEO), NR (GEO), and NR (OTHERSAT). NR (LEO) may mean connection via an LEO satellite using a communication function of NR and/or 5G performed between the UE and the core network. NR (MEO) may mean connection via an MEO satellite using a communication function of NR and/or 5G performed between the UE and the core network. NR (GEO) may mean connection via a GEO satellite using a communication function of NR and/or 5G performed between the UE and the core network. NR (OTHERSAT) may mean connection via a satellite other than LEO, MEO, and GEO using a communication function of NR and/or 5G performed between the UE and the core network. Values of the RAT types, such as NR (LEO), NR (MEO), NR (GEO), and NR (OTHERSAT), may be used in the 5GC in order to identify types of satellite connection.

In a case that the UE connects to NR or the network using satellite connection (in a case of connection using the NR satellite connection), information indicating a type of NR satellite connection (which may be the RAT type) may be provided between the AMF and the base station using an N2 interface.

The TA to which a cell (communication area) of the RAT type for each satellite connection belongs may be different from the TA to which a cell of another RAT type belongs, or may be different from the TA to which a terrestrial RAT type belongs.

In a case that the AMF receives, from the base station, a release request (for example, an N2 UE context release request) related to N2 connection together with a cause value indicating that the UE is not present in a serving area of the PLMN, the AMF may initiate the de-registration procedure in order to deregister the UE.

Network selection for satellite connection (PLMN selection and access network selection) may provide the same as terrestrial network selection.

In satellite connection, a UE having a capability of identifying a position (also referred to as a location capability) may use information related to the position of the UE to select a PLMN operable or connectable at the position.

A cell moving for satellite connection, that is, a cell moving along with movement of a satellite, may indicate support of one or more TACs for each PLMN.

A UE registered with a certain PLMN (PLMN providing satellite connection) may be able to connect to a cell. In a case that TAC for a PLMN (also referred to as an EPLMN) in a relationship equivalent to the RPLMN or the RPLMN is a part of the registration area of the UE, the UE need not perform the registration procedure (registration procedure to be performed along with movement).

In a case that the TAC for the PLMN in a relationship equivalent to the RPLMN or the RPLMN is not present in the registration area of the UE, the UE may perform the registration procedure (registration procedure to be performed along with movement).

In a case that the UE indicates the last visited TAI in the registration procedure, the UE may indicate at least a part of the TAIs supported in such a cell where the TAC for the PLMN in a relationship equivalent to the RPLMN or the RPLMN connected before the registration procedure is a part of the registration area of the UE.

Even in a case that the cell moves on a surface of the earth, the base station may change the value of the TAC, and broadcast the changed value of the TAC on system information of the cell.

The base station may broadcast one TAC for each PLMN in a cell, or may change the TAC value as the cell moves. The base station may broadcast one or more TACs for each PLMN in a cell, or may add or delete the TAC value as the cell moves.

The base station may transmit the TAI for the selected PLMN to the AMF.

The base station may indicate the TAI in which the UE is located to the AMF as well. The AMF may generate the registration area suitable for the UE by taking the TAI, in which the UE is located, received from the base station into consideration.

The AMF and the UE may receive one or more TAIs broadcast from the base station. In a case that a part or all of the received TAIs are forbidden, based on registration data (subscription data) of the UE, the AMF may consider that the UE is present in the forbidden area. In a case that a part or all of the received TAIs are forbidden, the UE may consider that the UE is present in the forbidden area. In a case that at least one of the received TAIs is not forbidden, the UE may consider that the UE is not present in the forbidden area.

The AMF may receive one or more TAIs broadcast from the base station. The AMF may provide service area restriction including an allowed area or a non-allowed area.

In a case of change to an appropriate cell indicating multiple TAs for the RPLMN and all of the multiple TAs are present outside of the registration area of the UE in the CM-CONNECTED state and the CM-IDLE state, the registration procedure may be initiated.

The UE may transmit the last visited TAI to the AMF in order to assist the AMF in generating the registration area for the UE.

The AMF may inspect the position of the UE in the registration procedure or the service request procedure, and determine whether the PLMN can operate at the position of the UE.

In a case that the UE receives a registration reject message or a service reject message including a cause value indicating that the PLMN is not allowed to operate at the present position of the UE, the UE may perform PLMN selection in order to select another PLMN.

In a case that the AMF detects that the PLMN with which the UE is registered is not allowed to operate at the present position of the UE, the AMF may initiate a network-initiated de-registration procedure. In this case, the AMF may transmit, to the UE, a de-registration request message including a cause value indicating that the PLMN is not allowed to operate at the present position of the UE.

In a case that the UE in satellite connection moves out of the serving area of the PLMN (area of the PLMN where communication can be performed), the UE may initiate an Access Network (AN) release procedure. Here, the AN release procedure may be a procedure performed for, regarding the UE, release of connection between the AN and the AMF, release of N3 user plane connection (connection between the AN and the UPF), release of connection between the UE and the AN, release of resources of the AN, and the like.

In the AN release procedure, in a case that the cause value included in the N2 UE context release request transmitted from the AN to the AMF indicates that the release is requested because the UE in satellite connection has moved out of the serving area of the PLMN, the AMF may initiate the de-registration procedure in order to deregister the UE without continuing the AN release procedure.

The AMF may inspect the position of the UE in the PDU session establishment procedure.

The UE may store a list of PLMNs not allowed to operate at the present position of the UE (present UE location). Each piece (also referred to as an entry) of information included in the list may include a PLMN ID, location information of the UE, and distance information of the UE. Here, the PLMN ID may be a PLMN ID of the PLMN that has transmitted a message including a 5GMM cause value indicating that the operation is not allowed at the present position of the UE. The location information of the UE may be location information of the UE that has received the message including the 5GMM cause value indicating that the operation is not allowed at the present position of the UE. The distance information of the UE may be information related to a distance between the satellite and the UE, for example.

The UE may delete an existing entry having the same PLMN ID before storing a new entry in the list of PLMNs not allowed to operate at the present position of the UE. In storing a new entry in the list of PLMNs not allowed to operate at the present position of the UE, a timer related to the entry may be started. Here, in a case that the UE receives a lower bound timer value from the network side, the UE may start the timer, using a timer value equal to or greater than the lower bound timer value. Note that the UE may receive, from the core network (for example, the AMF, the SMF, or the like), the lower bound timer value being included in a control message such as a registration reject message, a DL NAS TRANSPORT message, a de-registration request message, and a service reject message. In a case that the UE does not receive the lower bound timer value from the network side, the UE may start the timer, using a timer value set based on implementation.

In a case that the present position of the UE is known, the location information of the UE is stored in the entry of the PLMN, and the distance from the present position of the UE is greater than a prescribed value, the UE may connect to a PLMN included in the list of PLMNs not allowed to operate at the present position of the UE.

In a case that the timer related to the entry of the PLMN expires, the UE may connect to a PLMN included in the list of PLMNs not allowed to operate at the present position of the UE.

In a case that connection is for an emergency service, the UE may connect to a PLMN included in the list of PLMNs not allowed to operate at the present position of the UE.

The list of PLMNs not allowed to operate at the present position of the UE may be capable of accommodating three or more entries. In a case that the list of PLMNs not allowed to operate at the present position of the UE is full and a new entry is added, the UE may delete the oldest entry.

In a case that the UE succeeds in registration or a registration procedure for the PLMN stored in the entry except for a case of registration for an emergency service, the UE may delete the entry in the list of PLMNs not allowed to operate at the present position of the UE.

In a case that the timer related to the entry expires, the UE may delete the entry in the list of PLMNs not allowed to operate at the present position of the UE.

In a case that the present position of the UE is known, the location information of the UE is stored in the entry of the PLMN, and the distance from the present position of the UE is greater than a prescribed value, the UE may delete the entry in the list of PLMNs not allowed to operate at the present position of the UE.

In a case that the UE is in a 5GMM-DEREGISTERED.LIMITED-SERVICE state, and deletes the entry from the list of PLMNs not allowed to operate at the present position of the UE, the UE may perform PLMN selection.

In turning off the power of the UE, the UE may maintain, in a non-volatile memory, the list of PLMNs not allowed to operate at the present position of the UE.

In a case that the USIM is removed, the UE may delete the list of PLMNs not allowed to operate at the present position of the UE.

The AMF may have a function of determining a wait range, based on a configuration of the network. The AMF may transmit, to the UE, the wait range and/or information related to the wait range and/or information including the wait range through the registration procedure, and/or the configuration update procedure, and/or the service request procedure, and/or the de-registration procedure. For example, the AMF may transmit, to the UE, the wait range and/or the information related to the wait range and/or the information including the wait range on the registration accept message, and/or the registration reject message, and/or the configuration update command, and/or the de-registration request message, and/or the service accept message, and/or the service reject message, and/or the NAS message.

The UE may calculate a wait timer, based on the wait range and/or the information related to the wait range and/or the information including the wait range received from the network. In other words, the wait range may indicate a range used for determining the wait timer. The wait timer may be a timer value for setting a wait timer value or a timer used in the UE. The network may, in place of the UE, generate the wait timer from the wait range and transmit the wait range and/or the information related to the wait range and/or the information including the wait range to the UE on the control message. In this case, the UE may use the received wait timer.

The UE may start a timer using the wait timer after becoming unable to perform communication via a satellite and becoming able to perform communication via the satellite (this is also referred to as a case of returning to coverage from discontinuous coverage). The UE need not transmit a control message (for example, a NAS message, an RRC message, and/or the like) until the timer expires. In other words, the timer using the wait timer may be a timer to be started after becoming able to perform communication via a satellite after becoming unable to perform communication via the satellite, and a timer for configuring a time period during which the UE is unable to transmit a control message.

The UE capable of communication via a satellite may receive, from the network, a wait range in the registration procedure, and/or the configuration update procedure, and/or the service request procedure, and/or the de-registration procedure performed in a first PLMN via a first satellite. Note that the UE may transmit, to the network, UE capability information indicating that the UE has a capability of calculating/generating a wait timer based on a wait range in a procedure the same as or prior to the procedure for receiving the wait range. In other words, the UE may transmit a UE capability indicating whether to support the wait range, and/or the wait timer, and/or the timer using the wait timer in order to determine whether the NW side may transmit the wait range. Then, the network may transmit the wait range only to the UE having the capability, based on the received UE capability information. Then, in a case that the UE becomes able to perform communication via a second satellite connected to the first PLMN after becoming unable to perform communication via the first satellite, the UE may select the first PLMN. Note that, in a case that the first PLMN has already been selected, the UE need not select the first PLMN again. Then, the UE may generate the wait timer, based on the wait range. The UE may start the timer using the wait timer immediately after generating the wait timer, or may start the timer using the wait timer in a case that prescribed time or a prescribed condition is satisfied. In a case of making emergency call during the timer running, the UE may stop the timer and perform the registration procedure, and/or the MM procedure, and/or the SM procedure for the emergency call. In a case of not making the emergency call during the timer running, the UE may perform the registration procedure, and/or the MM procedure, and/or the SM procedure in the first PLMN after the timer has expired. The PLMN may be interpreted as a PLMN and/or an RAT. Note that the first PLMN may be the HPLMN, or may be the VPLMN. In a case that the UE again becomes unable to perform communication via the second satellite connected to the first PLMN before the timer using the wait timer expires, the UE may stop the timer and perform PLMN selection in order to select another PLMN that can be connected via the satellite (for example, a second PLMN or a third PLMN) and/or another PLMN that can be connected without using the satellite (for example, a fourth PLMN). In a case that the UE again becomes unable to perform communication via the satellite for the second PLMN before the timer using the wait timer expires, the UE may perform PLMN selection in order to select another PLMN that can be connected via the satellite and/or another PLMN that can be connected without using the satellite, without stopping the timer. In a case that the UE again becomes unable to perform communication via the satellite for the second PLMN before the timer using the wait timer expires, the UE may perform PLMN selection in order to select another PLMN that can be connected via the satellite and/or another PLMN that can be connected without using the satellite, and may subsequently stop the timer. In the registration procedure performed in a certain PLMN, the network may transmit the wait range to the UE, and then in the registration procedure and/or the configuration update procedure performed in the same PLMN, the network may transmit the updated wait range to the UE, so as to update the wait range, and/or the wait timer, and/or the timer using the wait timer. In other words, in the registration procedure performed in a certain PLMN, the UE may receive the wait range from the network, and then in the registration procedure and/or the configuration update procedure performed in the same PLMN, the UE may receive the updated wait range from the network, so as to update the wait range, and/or the wait timer, and/or the timer using the wait timer.

The UE capable of communication via the satellite may receive, from the network, the wait range in the registration procedure, and/or the configuration update procedure, and/or the service request procedure, and/or the de-registration procedure performed in the first PLMN via the first satellite. Note that the UE may transmit, to the network, UE capability information indicating that the UE has a capability of calculating/generating a wait timer based on a wait range in a procedure the same as or prior to the procedure for receiving the wait range. In other words, the UE may transmit a UE capability indicating whether to support the wait range, and/or the wait timer, and/or the timer using the wait timer in order to determine whether the NW side may transmit the wait range. Then, the network may transmit the wait range only to the UE having the capability, based on the received UE capability information. In a case that the UE becomes able to perform communication via the second satellite connected to the second PLMN after becoming unable to perform communication via the first satellite, the UE may select the second PLMN. Then, the UE may generate the wait timer, based on the wait range. The UE may start the timer using the wait timer immediately after generating the wait timer, or may start the timer using the wait timer in a case that prescribed time or a prescribed condition is satisfied. In a case of making emergency call during the timer running, the UE may stop the timer and perform the registration procedure, and/or the MINI procedure, and/or the SM procedure for the emergency call. In a case of not making the emergency call during the timer running, the UE may perform the registration procedure, and/or the MINI procedure, and/or the SM procedure in the second PLMN after the timer has expired. Here, note that the first PLMN may be the HPLMN, or may be the VPLMN. The second PLMN may be a PLMN different from the first PLMN. The second PLMN may be the equivalent PLMN. The second PLMN may be a PLMN included in the forbidden PLMN list. The PLMN may be interpreted as a PLMN and/or an RAT. In a case that the UE again becomes unable to perform communication via the second satellite connected to the second PLMN before the timer using the wait timer expires, the UE may stop the timer and perform PLMN selection in order to select another PLMN that can be connected via the satellite (for example, a first PLMN or a third PLMN) and/or another PLMN that can be connected without using the satellite (for example, a fourth PLMN). In a case that the UE again becomes unable to perform communication via the satellite for the second PLMN before the timer using the wait timer expires, the UE may perform PLMN selection in order to select another PLMN that can be connected via the satellite and/or another PLMN that can be connected without using the satellite, without stopping the timer. In a case that the UE again becomes unable to perform communication via the satellite for the second PLMN before the timer using the wait timer expires, the UE may perform PLMN selection in order to select another PLMN that can be connected via the satellite and/or another PLMN that can be connected without using the satellite, and may subsequently stop the timer. In the registration procedure performed in a certain PLMN, the network may transmit the wait range to the UE, and then in the registration procedure and/or the configuration update procedure performed in the same PLMN, the network may transmit the updated wait range to the UE, so as to update the wait range, and/or the wait timer, and/or the timer using the wait timer. In other words, in the registration procedure performed in a certain PLMN, the UE may receive the wait range from the network, and then in the registration procedure and/or the configuration update procedure performed in the same PLMN, the UE may receive the updated wait range from the network, so as to update the wait range, and/or the wait timer, and/or the timer using the wait timer. In the registration procedure performed in a certain PLMN, the network may transmit the wait range to the UE, and then in the registration procedure and/or the configuration update procedure performed in a different PLMN, the network may transmit the updated wait range to the UE, so as to update the wait range, and/or the wait timer, and/or the timer using the wait timer. In other words, in the registration procedure performed in a certain PLMN, the UE may receive the wait range from the network, and then in the registration procedure and/or the configuration update procedure performed in a different PLMN, the UE may receive the updated wait range from the network, so as to update the wait range, and/or the wait timer, and/or the timer using the wait timer.

In a case that the UE waits until the coverage of the same RAT and/or PLMN that has been used for communication via the satellite recovers (that is, until the UE becomes able to perform communication via the satellite by the same RAT and/or PLMN) with a cause being becoming unable to perform communication via the satellite (this is also referred to as discontinuous coverage), the UE may calculate the wait timer, based on the wait range and/or the information related to the wait range and/or the information including the wait range received from the network. The calculation of the wait timer may be performed after becoming unable to perform communication via the satellite and before becoming able to perform communication via the satellite. The start of the timer using the wait timer may be performed after becoming unable to perform communication via the satellite and before becoming able to perform communication via the satellite, and may be performed after becoming unable to perform communication via the satellite and after becoming able to perform communication via the satellite. In other words, in a case that the timer using the wait timer is a timer to be started after becoming able to perform communication via the satellite for the same RAT and/or PLMN after becoming unable to perform communication via the satellite, the timer using the wait timer may be a timer for configuring a time period during which the UE cannot transmit a control message. In a case that the timer using the wait timer is a timer to be started before becoming able to perform communication via the satellite for the same RAT and/or PLMN after becoming unable to perform communication via the satellite, the timer using the wait timer may have a function as a timer for configuring a time period during which the UE cannot transmit a control message and/or a function as a timer for indicating a time period for recovering the coverage for the same RAN and/or PLMN.

The calculation of the wait timer may be performed after becoming unable to perform communication via a satellite and after becoming able to perform communication via the satellite. The start of the timer using the wait timer may be performed after becoming unable to perform communication via a satellite and after becoming able to perform communication via the satellite. In other words, the timer using the wait timer may be a timer to be started after becoming able to perform communication via the satellite for the same RAT and/or PLMN after becoming unable to perform communication via the satellite, and a timer for configuring a time period during which the UE cannot transmit a control message.

In a case that the UE communicates with the core network via the satellite by using a certain PLMN (here, PLMN A) and a certain RAT (for example, 3G, 4G, or 5G radio access technology; here, RAT A), the core network may generate the wait range and notify the UE of the wait range, and the UE may receive the wait range and recognize the wait range. Subsequently, after becoming able to perform communication via the satellite by the same RAT (RAT A) and the same PLMN (PLMN A) after becoming unable to perform communication via the satellite (this is also referred to as a case of returning to coverage from discontinuous coverage), the UE may start the timer using the wait timer. In other words, the wait range, the wait timer, and the timer using the wait timer may be applied to the same RAT and the same PLMN. In still other words, the wait range, and/or the wait timer, and/or the timer using the wait timer may be applied only to the same PLMN. Here, generation of the wait timer from the wait range by the UE may be performed after recovery of the coverage, or may be performed immediately after receiving the wait range (that is, before becoming unable to perform communication via the satellite).

In a case that the UE communicates with the core network via the satellite by using a certain PLMN (here, PLMN A) and a certain RAT (here, RAN A), the core network may generate the wait range and notify the UE of the wait range, and the UE may receive the wait range and recognize the wait range. Subsequently, after becoming able to perform communication via the satellite by a different RAT (RAT B) and the same PLMN (PLMN A) after becoming unable to perform communication via the satellite (this is also referred to as a case of returning to coverage from discontinuous coverage), the UE may start the timer using the wait timer. In other words, the wait range, the wait timer, and the timer using the wait timer may be applied to a different RAT and the same PLMN. In still other words, the wait range, and/or the wait timer, and/or the timer using the wait timer may be applied to the same or different RAT and the same PLMN. In still other words, the wait range, and/or the wait timer, and/or the timer using the wait timer may be applied to the same PLMN and not dependent on the RAT. Here, generation of the wait timer from the wait range by the UE may be performed after recovery of the coverage, or may be performed immediately after receiving the wait range (that is, before becoming unable to perform communication via the satellite).

In a case that the UE communicates with the core network via the satellite by using a certain PLMN (here, PLMN A) and a certain RAT (here, RAN A), the core network may generate the wait range and notify the UE of the wait range, and the UE may receive the wait range and recognize the wait range. Subsequently, after becoming able to perform communication via the satellite by the same RAT (RAT A) and a different PLMN (PLMN B) after becoming unable to perform communication via the satellite (this is also referred to as a case of returning to coverage from discontinuous coverage), the UE may start the timer using the wait timer. In other words, the wait range, the wait timer, and the timer using the wait timer may be applied to the same RAT and a different PLMN. In still other words, the wait range, and/or the wait timer, and/or the timer using the wait timer may be applied only to a different PLMN. Alternatively, the wait range, and/or the wait timer, and/or the timer using the wait timer may be applied to all of the PLMNs. Here, generation of the wait timer from the wait range by the UE may be performed after recovery of the coverage, or may be performed immediately after receiving the wait range (that is, before becoming unable to perform communication via the satellite).

In a case that the UE communicates with the core network via the satellite by using a certain PLMN (here, PLMN A) and a certain RAT (here, RAN A), the core network may generate the wait range and notify the UE of the wait range, and the UE may receive the wait range and recognize the wait range. Subsequently, after becoming able to perform communication via the satellite by a different RAT (RAT B) and a different PLMN (PLMN B) after becoming unable to perform communication via the satellite (this is also referred to as a case of returning to coverage from discontinuous coverage), the UE may start the timer using the wait timer. In other words, the wait range, the wait timer, and the timer using the wait timer may be applied to a different RAT and a different PLMN. In still other words, the wait range, and/or the wait timer, and/or the timer using the wait timer may be applied only to a different PLMN. Alternatively, the wait range, and/or the wait timer, and/or the timer using the wait timer may be applied to all of the PLMNs. Here, generation of the wait timer from the wait range by the UE may be performed after recovery of the coverage, or may be performed immediately after receiving the wait range (that is, before becoming unable to perform communication via the satellite).

In a case of making emergency call during when the timer using the wait timer is running (that is, before expiration), the UE may perform the MM procedure and/or the SM procedure for the same PLMN even before the timer expires. In other words, in a case of making emergency call during when the timer using the wait timer is running (that is, before expiration), the UE may transmit and/or receive a control message (for example, a NAS message, an RRC message, and/or the like) to and/or from the same PLMN even before the timer expires. In this case, the UE may stop the timer and then perform the MM procedure and/or the SM procedure. Note that the UE may stop the timer while performing the MM procedure and/or the SM procedure, or may stop the timer after performing the MM procedure and/or the SM procedure. In the MM procedure and/or the SM procedure, the control message transmitted by the UE may include information indicating that it is the emergency call via the satellite. For example, in a case that the MM procedure is the registration procedure, the 5GS registration type IE included in the registration request message transmitted by the UE may be set with emergency registration. In the MM procedure and/or the SM procedure, in a case that the control message received from the UE includes the information indicating that it is the emergency call via the satellite, the network (for example, the AMF and/or the SMF) may transmit, to the UE, the control message including information indicating allowing the emergency call via the satellite.

In a case of making emergency call during when the timer using the wait timer is running (that is, before expiration), the UE may perform the MM procedure and/or the SM procedure for the same PLMN and/or the same or a different RAT even before the timer expires. In other words, in a case of making emergency call during when the timer using the wait timer is running (that is, before expiration), the UE may transmit and/or receive a control message (for example, a NAS message, an RRC message, and/or the like) to and/or from the same PLMN and/or the same or a different RAT even before the timer expires. In this case, the UE may stop the timer and then perform the MM procedure and/or the SM procedure. Note that the UE may stop the timer while performing the MM procedure and/or the SM procedure, or may stop the timer after performing the MM procedure and/or the SM procedure. In the MM procedure and/or the SM procedure, the control message transmitted by the UE may include information indicating that it is the emergency call via the satellite. For example, in a case that the MM procedure is the registration procedure, the 5GS registration type IE included in the registration request message transmitted by the UE may be set with emergency registration. In the MM procedure and/or the SM procedure, in a case that the control message received from the UE includes the information indicating that it is the emergency call via the satellite, the network (for example, the AMF and/or the SMF) may transmit, to the UE, the control message including information indicating allowing the emergency call via the satellite.

In a case of making emergency call during when the timer using the wait timer is running (that is, before expiration), the UE may select another PLMN and perform the MM procedure and/or the SM procedure for the selected PLMN even before the timer expires. In other words, in a case of making emergency call during when the timer using the wait timer is running (that is, before expiration), the UE may select another PLMN and transmit and/or receive a control message (for example, a NAS message, an RRC message, and/or the like) to and/or from the selected PLMN even before the timer expires. Here, another PLMN may include a PLMN included in the forbidden PLMN list, and an equivalent PLMN for the HPLMN or the RPLMN. The operation may be, for example, operation performed in a case that the already selected PLMN and/or the network slice in the PLMN is congested. In this case, the UE may stop the timer and then perform the MM procedure and/or the SM procedure. Note that the UE may stop the timer while performing the MM procedure and/or the SM procedure, or may stop the timer after performing the MM procedure and/or the SM procedure. In the MM procedure and/or the SM procedure, the control message transmitted by the UE may include information indicating that it is the emergency call via the satellite. For example, in a case that the MM procedure is the registration procedure, the 5GS registration type IE included in the registration request message transmitted by the UE may be set with emergency registration. In the MM procedure and/or the SM procedure, in a case that the control message received from the UE includes the information indicating that it is the emergency call via the satellite, the network (for example, the AMF and/or the SMF) may transmit, to the UE, the control message including information indicating allowing the emergency call via the satellite.

In a case of making emergency call during when the timer using the wait timer is running (that is, before expiration), the UE may select another PLMN and/or the same or a different RAT and perform the MM procedure and/or the SM procedure for the selected PLMN and RAT even before the timer expires. In other words, in a case of making emergency call during when the timer using the wait timer is running (that is, before expiration), the UE may select another PLMN and/or the same or a different RAT and transmit and/or receive a control message (for example, a NAS message an RRC message, and/or the like) to and/or from the selected PLMN and RAT even before the timer expires. Here, another PLMN may include a PLMN included in the forbidden PLMN list, and an equivalent PLMN for the HPLMN or the RPLMN. The operation may be, for example, operation performed in a case that the already selected PLMN, and/or the network slice in the PLMN, and/or the RAT is congested. In this case, the UE may stop the timer and then perform the MM procedure and/or the SM procedure. Note that the UE may stop the timer while performing the MM procedure and/or the SM procedure, or may stop the timer after performing the MM procedure and/or the SM procedure. In the MM procedure and/or the SM procedure, the control message transmitted by the UE may include information indicating that it is the emergency call via the satellite. For example, in a case that the MA/I procedure is the registration procedure, the 5GS registration type IE included in the registration request message transmitted by the UE may be set with emergency registration. In the MM procedure and/or the SM procedure, in a case that the control message received from the UE includes the information indicating that it is the emergency call via the satellite, the network (for example, the AMF and/or the SMF) may transmit, to the UE, the control message including information indicating allowing the emergency call via the satellite.

Note that the above may be applied to the NPN (SNPN and/or PNI-NPN). In other words, the present embodiment may be applied to the NPN as well, by replacing the PLMN with the SNPN.

4. Modified Examples

A program running on an apparatus according to an aspect of the present invention may serve as a program that controls a Central Processing Unit (CPU) and the like to cause a computer to operate in such a manner as to realize the functions of the embodiment according to the present invention. Programs or information handled by the programs are temporarily stored in a volatile memory such as a Random Access Memory (RAM), a non-volatile memory such as a flash memory, a Hard Disk Drive (HDD), or another storage device system.

Note that a program for realizing such the functions of the embodiment according to an aspect of the present invention may be recorded on a computer-readable recording medium. This configuration may be realized by causing a computer system to read the program recorded on the recording medium and to perform the program. It is assumed that the "computer system" refers to a computer system built into the apparatuses, and the computer system includes an operating system and hardware components such as a peripheral device. Furthermore, the "computer-readable recording medium" may be a semiconductor recording medium, an optical recording medium, a magnetic recording medium, a medium dynamically holding the program for a short time, or any other computer readable recording medium.

Furthermore, each functional block or various features of the apparatuses used in the aforementioned embodiment may be implemented or performed on an electric circuit, for example, an integrated circuit or multiple integrated circuits. An electric circuit designed to perform the functions described in the present specification may include a general purpose processor, a digital signal processor (DSP), an application specific integrated circuit (ASIC), a field programmable gate array (FPGA), or other programmable logic devices, discrete gates or transistor logic, discrete hardware components, or a combination thereof. The general-purpose processor may be a microprocessor, or may be a known processor, a controller, a micro-controller, or a state machine. The aforementioned electric circuit may include a digital circuit or may include an analog circuit. Furthermore, in a case that with advances in semiconductor technology, a circuit integration technology appears that replaces the present integrated circuits, it is also possible to use a new integrated circuit based on the technology according to one or more aspects of the present invention.

Note that, the invention of the present application is not limited to the above-described embodiments. In the embodiment, apparatuses have been described as an example, but an aspect of the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

Although, the embodiments of the present invention have been described in detail above referring to the drawings, the specific configuration is not limited to the embodiments and includes, for example, design changes within the scope that does not depart from the gist of the present invention. For an aspect of the present invention, various modifications are possible within the scope of the claims, and embodiments that are made by suitably combining technical means disclosed according to the different embodiments are also included in the technical scope of the present invention. A configuration in which elements described in the respective embodiments and having mutually the same effects, are substituted for one another is also included.

REFERENCE SIGNS LIST

1 Mobile communication system
10 UE_A
30 PGW-U
32 PGW-C
35 SGW
40 MME
45 eNB
50 HSS
60 PCRF
80 Access network_A
90 Core network_A
120 Access network_B
122 gNB 130 UPF
132 SMF
140 AMF
150 UDM
160 PCF
170 N3IWF
190 Core network_B

The invention claimed is:

1. A User Equipment (UE) comprising:
transmission and reception circuitry;
controlling circuitry; and
storage circuitry, wherein
in a case that the transmission and reception circuitry receives, from a network, in a registration accept message or a configuration update command message, first information which is applied to a first public land mobile network (PLMN) and a first radio access technology (RAT), the controlling circuitry is configured to replace second information, which is stored in the storage circuitry and is applied to the first PLMN and the first RAT, with the first information, and
in a case that the UE returns in coverage after being out of coverage due to discontinuous coverage, the controlling circuitry is further configured to:
set a wait timer to a wait timer value which is applied to the first PLMN and the first RAT based on the first information, and
start the wait timer.

2. The UE according to claim 1, wherein the first information is information indicating a range used for setting the wait timer.

3. A communication control method performed by a User Equipment (UE), the communication control method comprising:
in a case that the UE receives, from a network, in a registration accept message or a configuration update command message, first information which is applied to a first public land mobile network (PLMN) and a first radio access technology (RAT), replacing second information, which is stored in the UE and is applied to the first PLMN and the first RAT, with the first information; and
in a case that the UE returns in coverage after being out of coverage due to discontinuous coverage:
setting a wait timer to a wait timer value which is applied to the first PLMN and the first RAT based on the first information, and
starting the wait timer.

* * * * *